(12) United States Patent
Ota

(10) Patent No.: US 12,370,793 B2
(45) Date of Patent: Jul. 29, 2025

(54) PRINTING DEVICE, PRINTING METHOD, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Shoko Ota, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 175 days.

(21) Appl. No.: 18/187,842

(22) Filed: Mar. 22, 2023

(65) Prior Publication Data
US 2023/0311491 A1    Oct. 5, 2023

(30) Foreign Application Priority Data

Apr. 1, 2022    (JP) .................... 2022-061985

(51) Int. Cl.
*B41J 2/045*    (2006.01)
*G06F 3/12*    (2006.01)

(52) U.S. Cl.
CPC ......... *B41J 2/04581* (2013.01); *B41J 2/0451* (2013.01); *B41J 2/04546* (2013.01); *B41J 2/04588* (2013.01); *G06F 3/1217* (2013.01); *G06F 3/1242* (2013.01)

(58) Field of Classification Search
CPC .. B41J 2/04581; B41J 2/0451; B41J 2/04546; B41J 2/04588; G06F 3/1217; G06F 3/1242
See application file for complete search history.

(56) References Cited

U.S. PATENT DOCUMENTS

2012/0077910 A1    3/2012   Yamanaka et al.
2017/0113461 A1*   4/2017   Netsu .................... B41J 2/04541

FOREIGN PATENT DOCUMENTS

| JP | S58-53784 Y2 | 12/1983 |
|----|--------------|---------|
| JP | 2001-54947 A | 2/2001 |
| JP | 2010-142978 A | 7/2010 |
| JP | 2011-1513 A | 1/2011 |
| JP | 2017-80891 A | 5/2017 |

OTHER PUBLICATIONS

Notice of Reasons for Refusal issued int he counterpart Japanese Patent Application No. 2022-061985, Mar. 5, 2024.

* cited by examiner

*Primary Examiner* — Lisa Solomon
(74) *Attorney, Agent, or Firm* — Merchant & Gould P.C.

(57) ABSTRACT

A printing device comprises a nozzle configured to eject liquid by an energy generating element, a first selector configured to select, for each particular time period, data indicating a drive waveform based on a voltage value in the particular time period, a signal generator configured to generate a time-division multiplex signal, and a separator configured to separate a drive waveform signal indicating the drive waveform from the time-division multiplex signal generated by the signal generator. The energy generating element is configured to be driven by the drive waveform separated by the separator, and the signal generator is configured to increase an assigned time period, in the particular time period, assigned per the drive waveform selected by the first selector as a number of the drive waveforms selected by the first selector decreases.

11 Claims, 14 Drawing Sheets

Da →

| ADDRESS X | TIME ta(X) |
|---|---|
| 8 | 2 μs |
| 7 | 1 μs |
| 6 | 2 μs |
| 5 | 1 μs |
| 4 | 5 μs |
| 3 | 1 μs |
| 2 | 5 μs |
| 1 | 1 μs |
| 0 | 2 μs |

$T_{ta}$

| ADDRESS X | VOLTAGE |
|---|---|
| 8 | 0 |
| 7 | V1 |
| 6 | V2 |
| 5 | V1 |
| 4 | 0 |
| 3 | V1 |
| 2 | V2 |
| 1 | V1 |
| 0 | 0 |

| ADDRESS X | TIME tb(X) |
|---|---|
| 4 | 5 μs |
| 3 | 1 μs |
| 2 | 9 μs |
| 1 | 1 μs |
| 0 | 4 μs |

$T_{tb}$

| ADDRESS X | VOLTAGE |
|---|---|
| 4 | 0 |
| 3 | V1 |
| 2 | V2 |
| 1 | V1 |
| 0 | 0 |

| ADDRESS X | TIME tc(X) |
|---|---|
| 4 | 11 μs |
| 3 | 1 μs |
| 2 | 5 μs |
| 1 | 1 μs |
| 0 | 2 μs |

$T_{tc}$

| ADDRESS X | VOLTAGE |
|---|---|
| 4 | 0 |
| 3 | V1 |
| 2 | V2 |
| 1 | V1 |
| 0 | 0 |

| ADDRESS X | TIME td(X) |
|---|---|
| 4 | 5 μs |
| 3 | 1 μs |
| 2 | 5 μs |
| 1 | 1 μs |
| 0 | 8 μs |

$T_{td}$

| ADDRESS X | VOLTAGE |
|---|---|
| 4 | 0 |
| 3 | V1 |
| 2 | V2 |
| 1 | V1 |
| 0 | 0 |

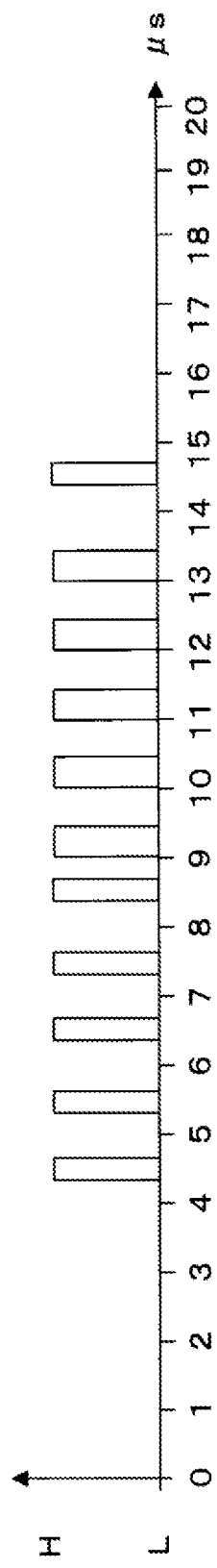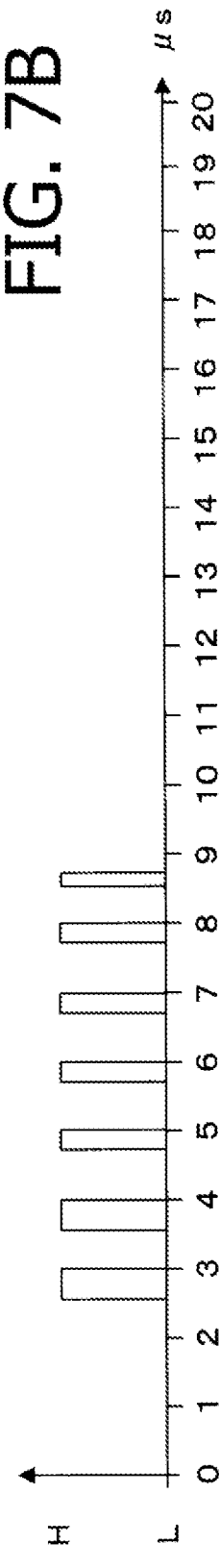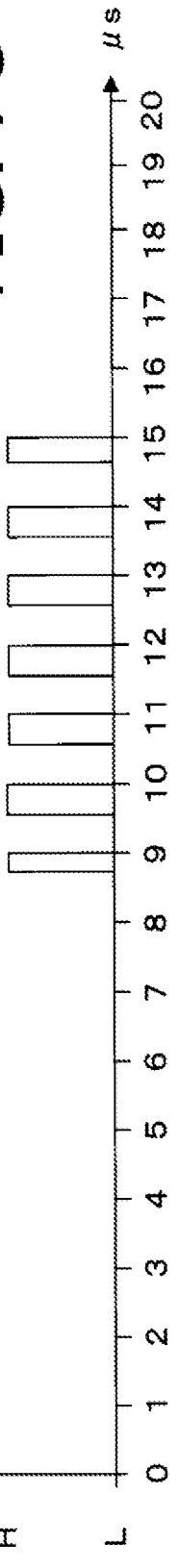

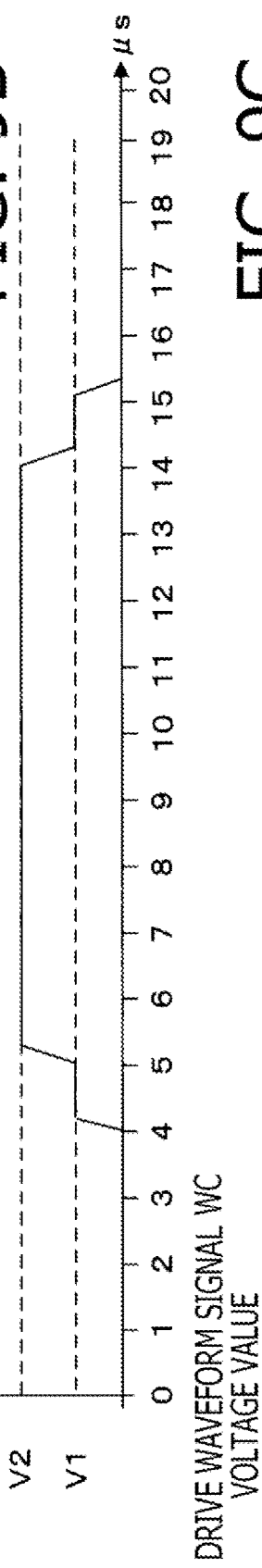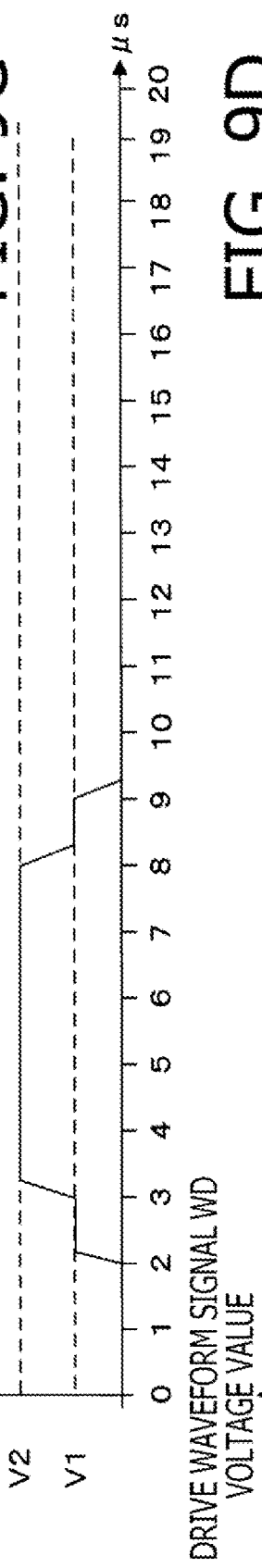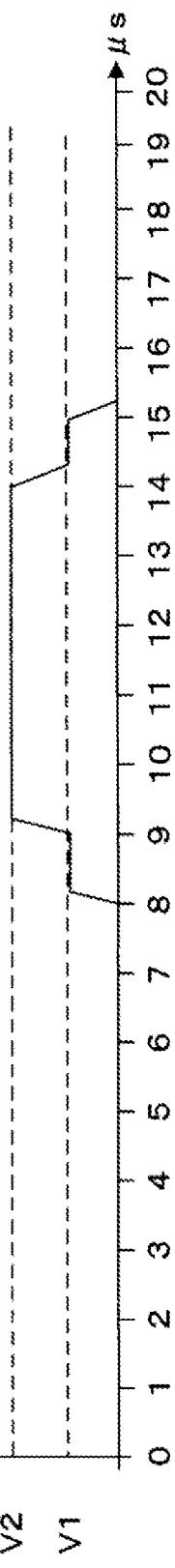

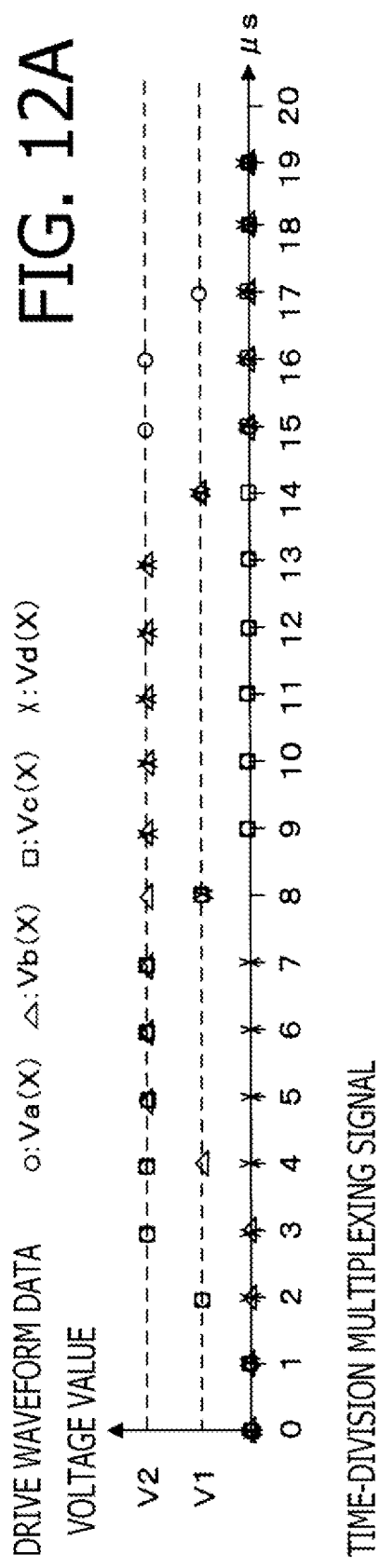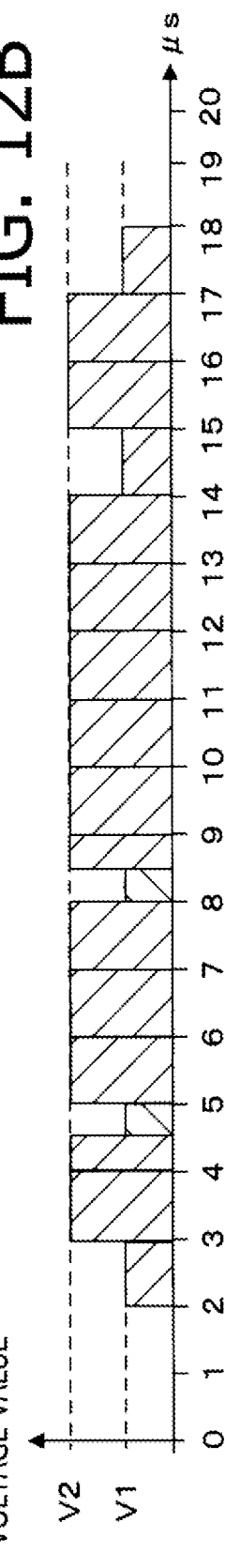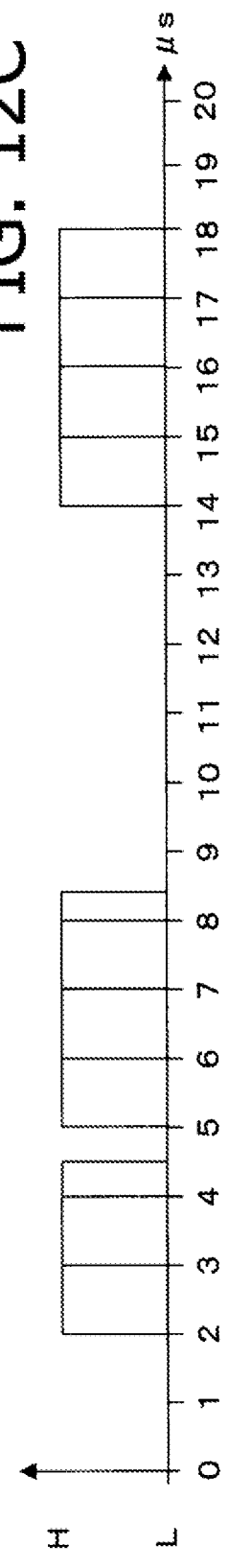

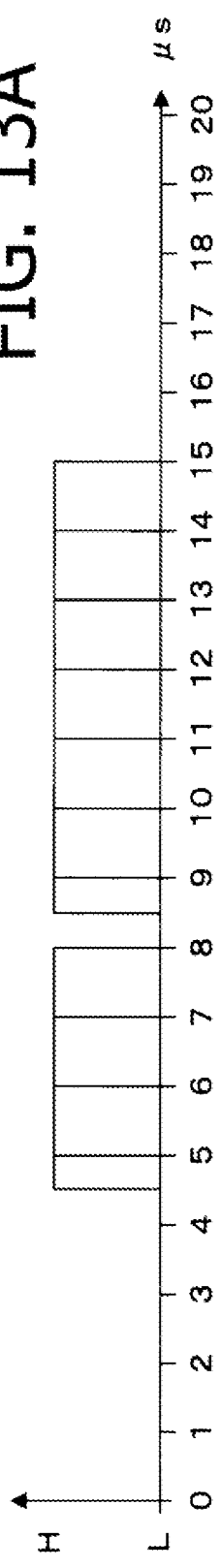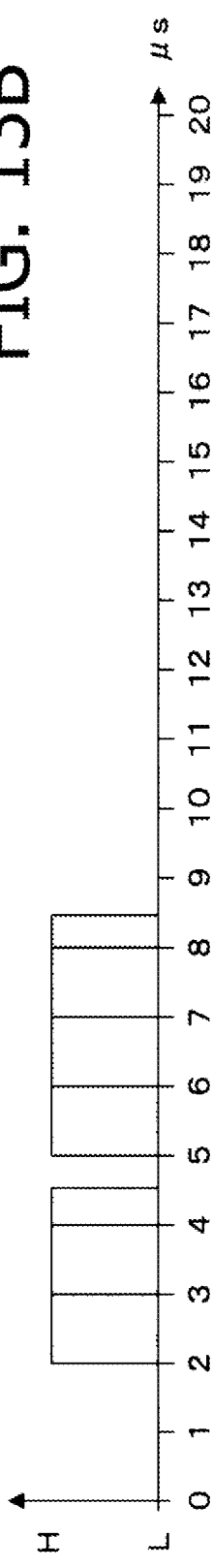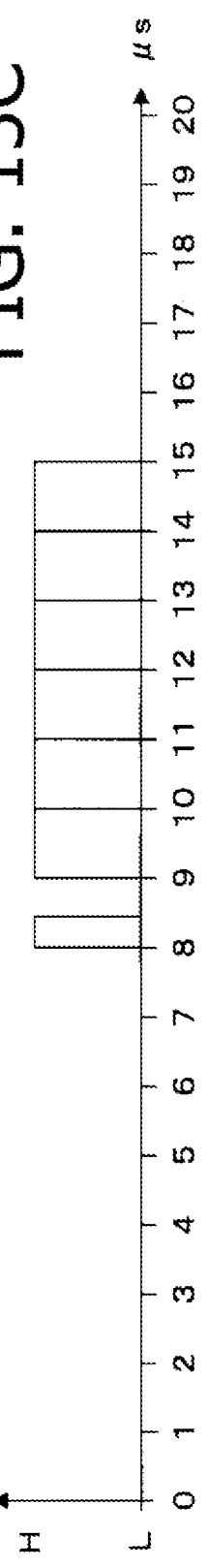

PRINTING DEVICE, PRINTING METHOD, AND NON-TRANSITORY COMPUTER-READABLE RECORDING MEDIUM THEREFOR

REFERENCE TO RELATED APPLICATIONS

This application claims priority from Japanese Patent Application No. 2022-061985 filed on Apr. 1, 2022. The entire content of the priority application is incorporated herein by reference.

BACKGROUND ART

The present disclosures relate to a printing device configured to eject ink from nozzles. The present disclosures also relate to a method employed in such a printing device, and a non-transitory computer-readable recording medium therefor.

There has been known a printer configured to generate first-fourth driving pulses respectively having different amplitudes for driving piezo elements provided to nozzles of the printer. Such a printer is typically configured such that the first-fourth driving pulses are sequentially generated during one period to print one pixel. Specifically, one of the first-fourth driving pulses is selected and applied to the piezo element of each nozzle. Then, the nozzle ejects ink of which amount corresponds to the amplitude of the selected driving pulse, thereby a dot having a desired size being formed.

Description

According to the above-describe conventional printer, four driving pulses are sequentially generated during one period, but only one driving pulse is selected. Therefore, time periods corresponding to the unselected three driving pulses serve as a standby time of the nozzle.

The present disclosures are advantageous in that such a standby time of the nozzle can be reduced by adjusting the amplitude of a drive waveform applied to an energy generating element such as the piezo element.

According to aspects of the present disclosures, there is provided a printing device, comprising a nozzle configured to eject liquid by an energy generating element, a first selector configured to select, for each particular time period, data indicating a drive waveform based on a voltage value in the particular time period from a plurality pieces of data indicating a plurality of drive waveforms, the plurality of drive waveforms including a first drive waveform and a second drive waveform, the second drive waveform being different from the first drive waveform, a signal generator configured to generate a time-division multiplex signal which is transmittable by a single signal based on the data indicating the drive waveform selected by the first selector, and a separator configured to separate a drive waveform signal indicating the drive waveform from the time-division multiplex signal generated by the signal generator. The energy generating element is configured to be driven by the drive waveform separated by the separator. The smaller a number of the drive waveforms are selected by the selecting, the longer an assigned time period, in the time period, assigned per the drive waveform selected by the selecting.

According to aspects of the present disclosures, there is provided a printing method by ejecting liquid by an energy generating element. The printing method comprises selecting, for each particular time period, data indicating a drive waveform based on a voltage value in the particular time period from a plurality pieces of data indicating a plurality of drive waveforms, the plurality of drive waveforms including a first drive waveform and a second drive waveform, the second drive waveform being different from the first drive waveform, generating a time-division multiplex signal which is transmittable by a single signal based on the data indicating the drive waveform selected by the first selector, and separating a drive waveform signal indicating the drive waveform from the time-division multiplex signal generated by the signal generator. The energy generating element is configured to be driven by the drive waveform separated by the separator. The smaller a number of the drive waveforms are selected by the selecting, the longer an assigned time period, in the time period, assigned per the drive waveform selected by the selecting.

According to aspects of the present disclosures, there is provided a non-transitory computer-readable recording medium for a printer configured to print by ejecting liquid by an energy generating element. The non-transitory computer-readable recording medium containing computer-readable instructions causing, when executed by a controller of the printer, the printer to perform selecting, for each particular time period, data indicating a drive waveform based on a voltage value in the particular time period from a plurality pieces of data indicating a plurality of drive waveforms, the plurality of drive waveforms including a first drive waveform and a second drive waveform, the second drive waveform being different from the first drive waveform, generating a time-division multiplex signal which is transmittable by a single signal based on the data indicating the drive waveform selected by the first selector, and separating a drive waveform signal indicating the drive waveform from the time-division multiplex signal generated by the signal generator. The energy generating element is configured to be driven by the drive waveform separated by the separator. The smaller a number of the drive waveforms are selected by the selecting, the longer an assigned time period, in the time period, assigned per the drive waveform selected by the selecting.

FIGS. 5A-5D show an example of time tables Tta-Ttd and voltage tables Tva-Tvd.

FIGS. 7A-7C are graphs respectively showing synchronization signals B-D.

FIGS. 9A-9D show drive waveform signals input to an actuator in accordance with ON/OFF of an n-th switch.

FIG. 12A is a graph plotting drive waveform data Da-Dd for one period over time.

FIG. 12B is a graph indicating a time-division multiplex signal according to the further modified embodiment.

FIG. 12C is a graph indicating a synchronization signal A.

FIGS. 13A-13C are graphs indicating synchronization signals B-D, respectively.

Figure 1:
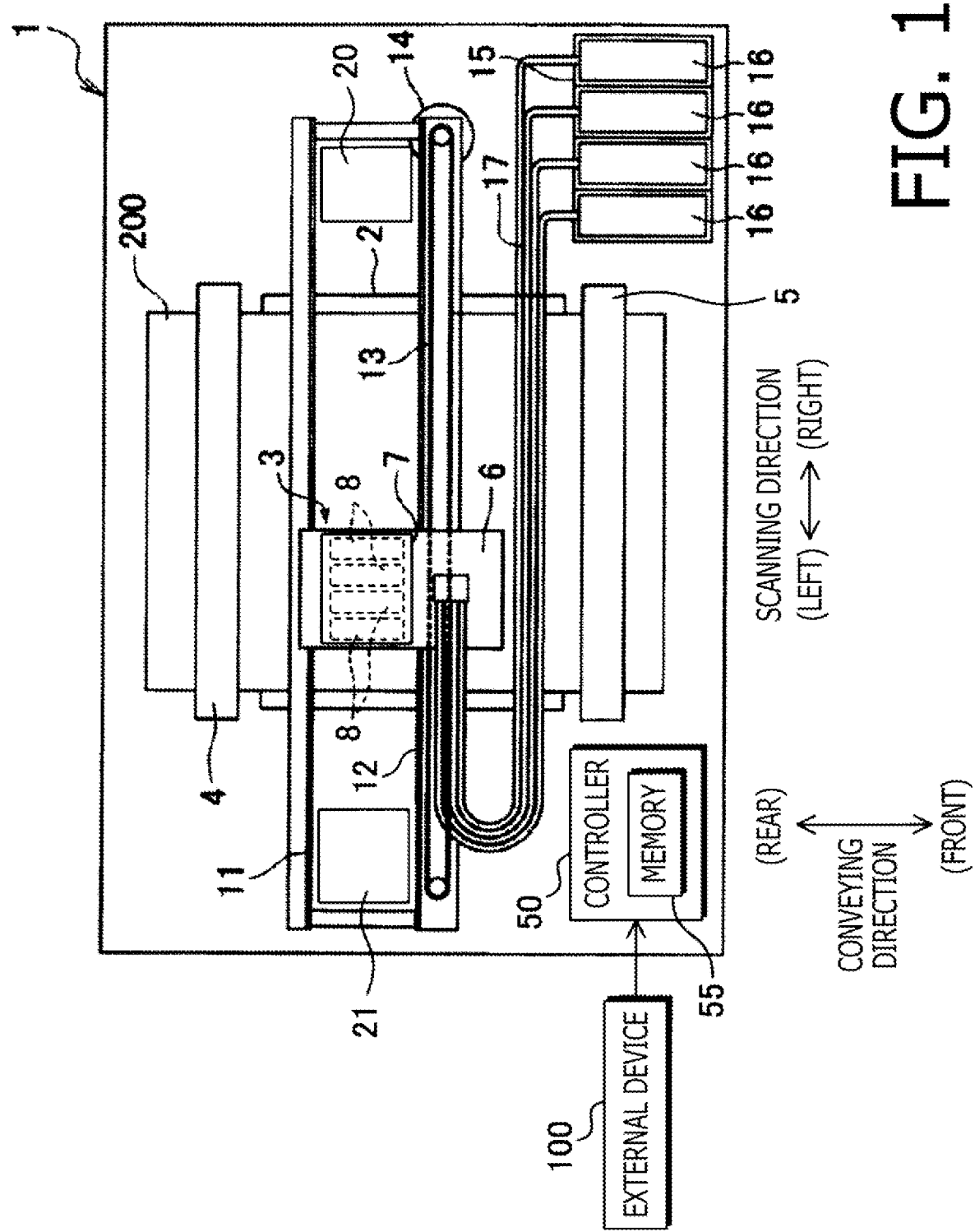
FIG. 1 is a plan view of a printing device according to an embodiment of the present disclosures.

Hereinafter, a printing device 1 according to an embodiment of the present disclosures will be described with reference to the drawings. FIG. 1 is a plan view schematically shows the printing device 1. In the following description, directions as shown in FIG. 1 will be referred to for indicating directions (i.e., front, rear, right and left directions). The front-rear direction corresponds to a sheet feed direction, and the right-left direction corresponds to a scanning direction. Further, a closer direction with respect to the plane of FIG. 1 corresponds to an up side of the printing device 1, and a farther side with respect to the plane of FIG. 1 corresponds to a down side of the printing device 1.

As shown in FIG. 1, the printing device 1 has a platen 2, an ink ejection device 3, and conveying rollers 4 and 5. On an upper surface of the platen 2, a printing sheet 200, which is a printing medium, is placed. The ink ejection device 3 is configured to eject the ink (i.e., ink droplets) on the printing sheet 200 placed on the platen 2 to print an image. The ink ejection device 3 has a carriage 6, a sub tank 7, four inkjet heads 8, and a circulation pump 10.

On the upper side of the platen 2, two guide rails 11 and 12 extending in the right-left direction are provided to guide the carriage 6. The carriage 6 is connected with an endless belt 13 that extends in the right-left direction. The endless belt 13 is driven, by the carriage driving motor 14, to move. As the endless belt 13 moves, the carriage 6 is guided by the guide rails 11 and 12, and is moved reciprocally in the scanning direction within an area facing the platen. More concretely, with supporting the four inkjet heads 8, the carriage 6 performs a first movement to move the inkjet head 8, in the scanning direction, from left to right, from a certain position to another position, and a second movement to move the inkjet head 8, in the scanning direction, from right to left, from a certain position to another position.

Between the guide rails 11 and 12, a cap 20 and flushing receiver 21 are provided. That cap 20 and the flushing receiver 21 are arranged on a lower side with respect to the ink ejection device 3. The cap 20 are arranged on a right end portion of the guide rails 11 and 12, while the flushing receiver 21 is arranged on a left end portion of the guide rails 11 and 12. It is noted that the cap 20 and flushing receiver 21 may be arranged reversely on the left and right.

The sub tank 7 and the four inkjet heads 8 are mounted on the carriage 6, and are moved, together with the carriage 6, reciprocally in the scanning direction. The sub tank 7 is connected to a cartridge holder 15 via a tube 17. To the cartridge holder 15, ink cartridges 16 of one or multiple colors (four colors, in the present embodiment) are mounted. The four colors are, for example, black, yellow, cyan, and magenta.

Inside the sub tank 7, four ink chambers are formed. In the four ink chambers, four colors of ink supplied by the four ink cartridges 16 are reserved, respectively.

The four inkjet heads 8 are arranged below the sub tank 7 in the scanning direction. On a lower surface of each inkjet head 8, multiple nozzles 80 (see FIG. 2) are formed. One inkjet head 8 corresponds to one color of ink and is connected to one ink chamber. In other words, the four inkjet heads 8 correspond to four colors of ink and are connected to the four ink chambers, respectively.

Each inkjet head 8 is provided with an ink inlet and an ink outlet. The ink inlet and the ink outlet are connected to the corresponding ink chamber via tubes. Between each ink inlet and the corresponding ink chamber, a circulation pump is interposed.

The ink sent from the ink chamber by the circulation pump flows into the inkjet heads 8 through the ink inlet and is ejected from the nozzles 80. The ink that is not ejected from the nozzles 80 returns to the inkjet head 8 through the ink inlet. The ink circulates between the ink chambers and the inkjet heads 8. The four inkjet heads 8 eject the four colors of ink toward the printing sheet 200 supplied from the sub tank 7, moving together with the carriage 6 in the scanning direction.

As shown in FIG. 1, the conveying roller 4 is arranged on an upstream side (i.e., the rear side), in the conveying direction, with respect to the platen 2. The conveying roller 5 is arranged on a downstream side (i.e., the front side), in the conveying direction, with respect to the platen 2. The two conveying rollers 4 and 5 are driven by a motor in a synchronized manner. The two conveying rollers 4 and 5 convey the printing sheet 200 placed on the platen 2 in the conveying direction that is orthogonal to the scanning direction. The printing device 1 has a controller 50. The controller 50 includes a CPU or a logic circuit (e.g., an FPGA (field-programmable gate array)), a non-volatile memory, and a memory 55 such as a RAM. The controller 50 receives a print job and drive waveform data from an external device 100 and stores the same in the memory 55. The controller 50 controls, based on the print job, driving of the ink ejection device 3 and the conveying roller 4 to perform a printing process.

Figure 2:
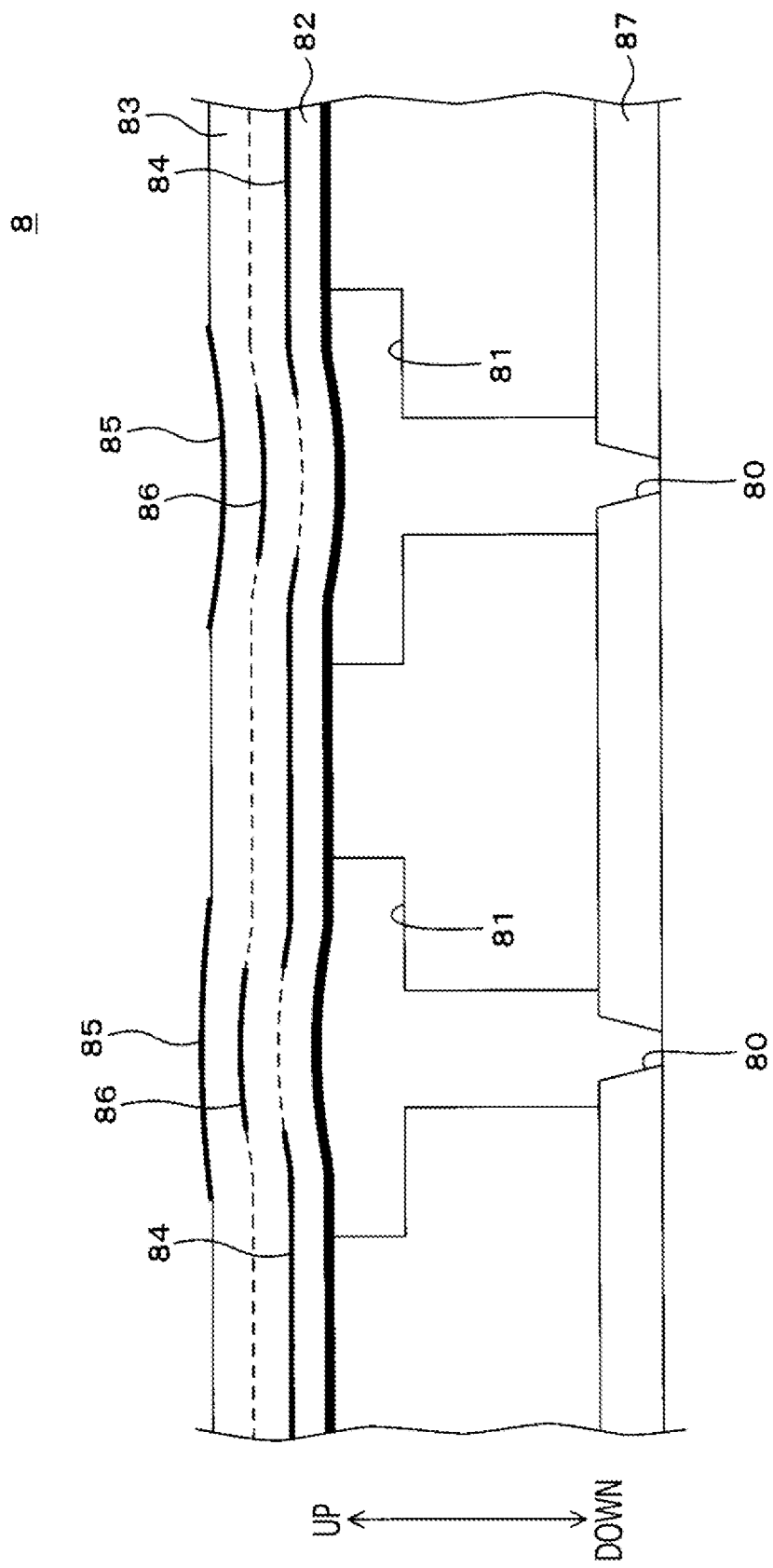
FIG. 2 is a partially enlarged cross-sectional view of an inkjet head.

FIG. 2 is a partially enlarged cross-sectional view of the inkjet head 8. The inkjet head 8 has multiple pressure chamber 81. The multiple pressure chambers 81 constitute multiple pressure chamber arrays. On an upper side with respect to each pressure chamber 81, a vibrating plate 82 is formed, and a layered piezoelectric body 83 is formed on an upper side with respect to the vibrating plate 82. On the upper side with respect to each pressure chamber 81, and between the piezoelectric body 83 and the vibrating plate 82, a first common electrode 84 is formed. It is noted that the piezoelectric body 83 is an example of an energy generating element according to aspects of the present disclosures.

Inside the piezoelectric body 83, a second common electrode 86 is provided. The second common electrode 86 is arranged on an upper side with respect to each pressure chamber 81 and on an upper side with respect to the first common electrode 84. The second common electrode 86 is arranged at a position that does not face the first common electrode 84. On an upper side of each pressure chamber 81, and on an upper surface of the piezoelectric body 83, an individual electrode 85 is formed. The individual electrode 85 is arranged opposite, in the up-down direction, to the first common electrode 84 and the second common electrode 86 with the piezoelectric body 83 sandwiched therebetween. The vibrating plate 84, the piezoelectric body 83, the first common electrode 84, the individual electrode 85 and the second common electrode 86 constitute an actuator 88.

On a lower part of each pressure chamber 81, a nozzle plate 87 is provided. On the nozzle plate 87, multiple nozzles 80, each of which penetrates through the nozzle plate 87 in the up-down direction, are formed. The nozzles 80 are arranged on the bottom surface of each pressure. The multiple nozzles constitute multiple nozzle arrays, each of which extends along the pressure chamber array.

The first common electrode 84 is connected to a COM terminal (in the present embodiment, the ground), and the second common electrode 86 is connected to a VCOM terminal. It is noted that a VCOM voltage is higher than a COM voltage. The individual electrode 85 is connected to a switch group 54 (see FIG. 3). The individual electrode 85 is applied with a High voltage or a Low voltage, thereby the piezoelectric body 83 deforming to vibrate the vibrating plate 82. As the vibrating plate 82 vibrates, the ink in the pressure chamber 81 is ejected through the nozzles 80.

Figure 3:
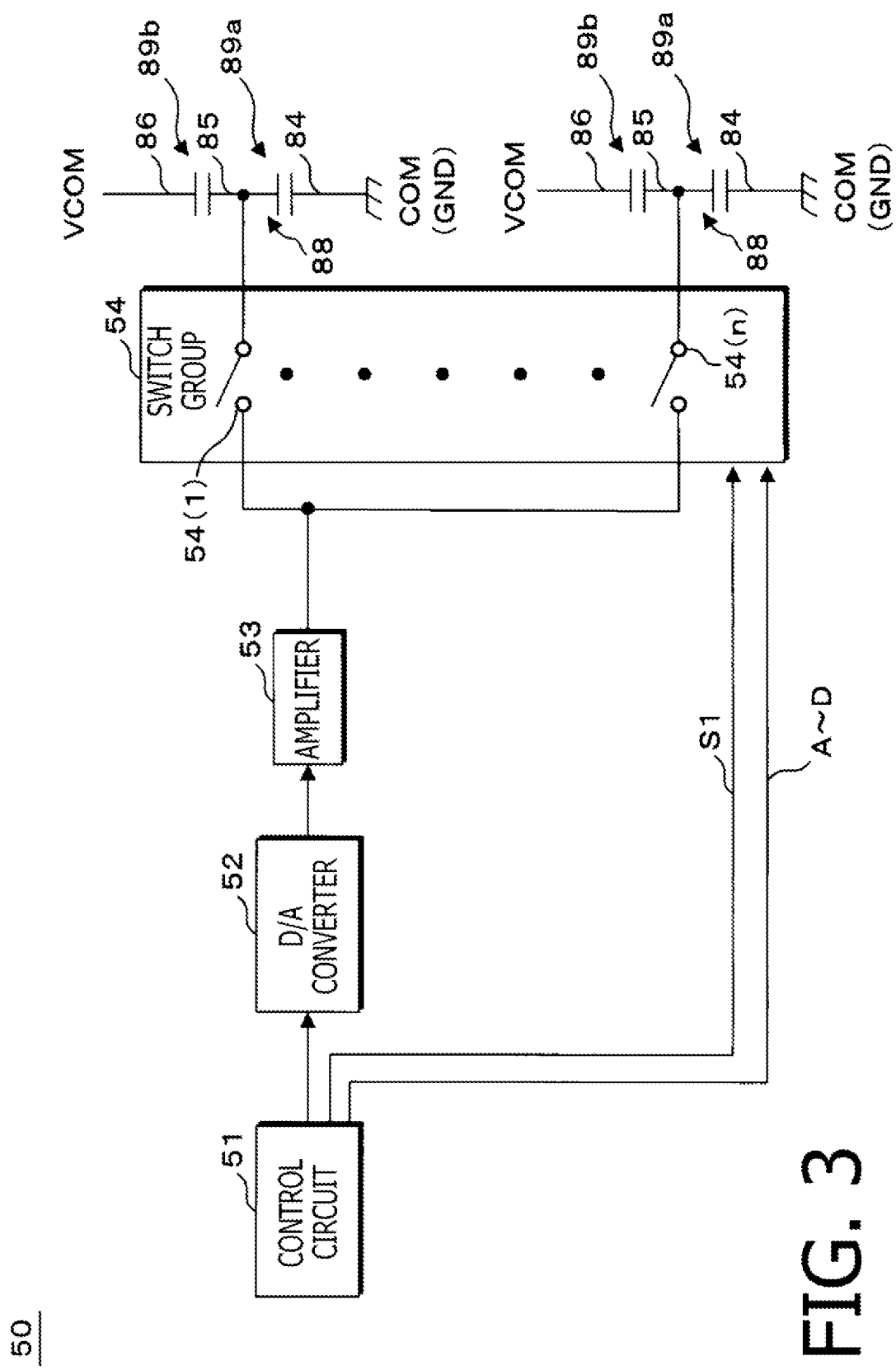
FIG. 3 is a block diagram of a controller of the printing device.

FIG. 3 is a block diagram of the controller 50. The controller 50 has a control circuit 51, a D/A (digital to analog) converter 52, an amplifier 53 and the switch group 54.

The D/A converter 52 converts a digital signal to an analog signal. The amplifier 53 amplifies the analog signal. The switch group 54 includes multiple n-th switches 54(*n*), (n=1, 2, . . . ). The n-th switch 54(*n*) is configured by, for example, an analog switch IC. One ends of the multiple n-th switches 54(*n*) are connected to the amplifier 53 through a common bus. The other ends of the multiple n-th switches 54(*n*) are connected to respective individual electrodes 85 corresponding to the multiple nozzles 80, respectively. That is, the n-th switches 54(*n*) are provided such that one n-th actuator 54(*n*) is provided to one actuator 88.

The individual electrodes 85, the first common electrodes 84 and the piezoelectric bodies 83 constitute first condensers 89*a*, respectively. Further, the individual electrodes 85, the second common electrodes 86 and the piezoelectric bodies 83 constitute second condensers 89*b*, respectively.

Figure 4:
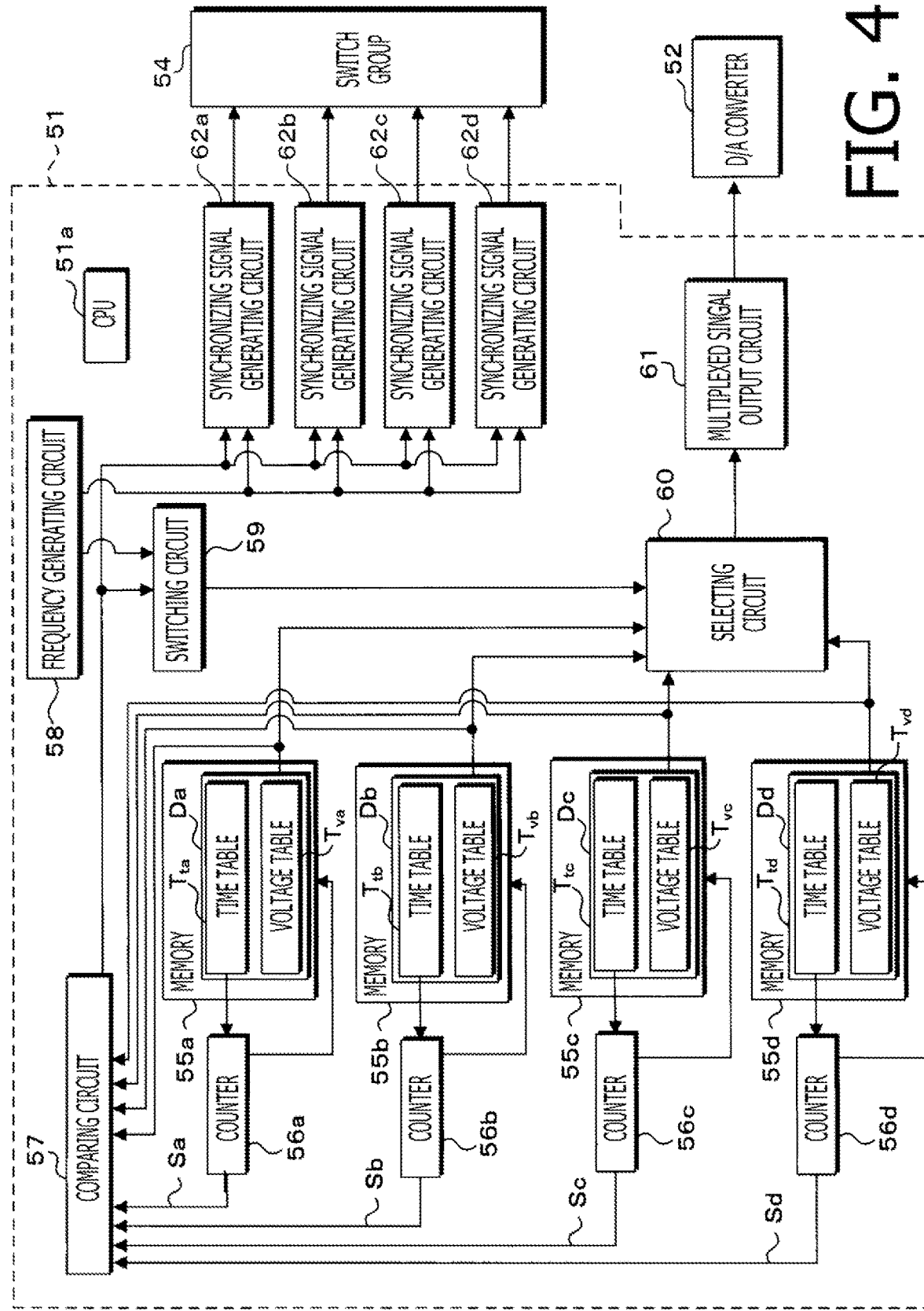
FIG. 4 is a block diagram of a control circuit.

FIG. 4 is a block diagram of the control circuit 51. The control circuit 51 includes a CPU 51*a*, four memories 55*a*-55*d*, four counters 56*a*-56*d*, a comparing circuit 57, a frequency generating circuit 58, a switching circuit 59, a selecting circuit 60, a multiplexed signal output circuit 61 and four synchronization signal generating circuits 62*a*-62*d*. The CPU 51*a* is an example of the controller. Instead of the CPU, an MPU or a logic circuit may be used.

In each of the memories 55*a*-55*d*, each of the drive waveform data Da-Dd is stored. The drive waveform Da-Dd is data indicating voltage waveforms applied to the individual electrodes 85, that is the data indicating the drive waveforms to drive the actuator 88, and is quantized data. The drive waveform data Da-Dd respectively indicates different drive waveforms.

FIGS. 5A-5D show tables indicating an example of time tables Tta-Ttd and voltage tables Tva-Tvd. The memory 55*a* stores the drive waveform data Da, which contains the time table Tta and the voltage table Tva. The time table Tta stores times ta(X) associated with addresses X (X=0, 1, 2, . . . ). In the present embodiment, the times ta(0)-ta(8) are 2 µs, 1 µs, 5 µs, 1 µs, 5 µs, 1 µs, 2 µs, 1 µs and 2 µs, respectively. The voltage table Tva stores voltage values Va(X) associated with the addresses X. In the present embodiment, the voltage values Va(0)-Va(8) are 0, V1, V2, V1, 0, V1, V2, V1 and 0, respectively. The voltage value V2 is larger than the voltage value V1. V1 is represented by a numerical value, which is, for example, 256. Similarly, V2 is represented by a numerical value, which is, for example, 512.

The memory 55*d* stores the drive waveform data Dd, which contains the time table Ttb and the voltage table Tvb. The time table Ttb stores the times tb(X) associated with the addresses X. In the present embodiment, the times tb(0)-tb (4) are 4 µs, 1 µs, 9 µs, 1 µs, and 5 µs, respectively. The voltage table Tvb stores the voltage values Vb(X) associated with the addresses X. In the present embodiment, the voltage values Vb(0)-Vb(4) are 0, V1, V2, V1 and 0, respectively.

The memory 55*c* stores the drive waveform data Dc, which contains the time table Ttc and the voltage table Tvc. The time table Ttc stores the times tc(x) associated with the addresses X. In the present embodiment, the times tc(0)-tc (4) are 2 µs, 1 µs, 5 µs, 1 µs, and 11 µs, respectively. The voltage table Tvc stores the voltage values Vc(X) associated with the addresses X. In the present embodiment, the voltage values Vc(0)-Vc(4) are 0, V1, V2, V1 and 0, respectively.

The memory 55*d* stores the drive waveform data Dd, which contains the time table Ttd and the voltage table Tvd. The time table Ttd stores the times td(x) associated with the addresses X. In the present embodiment, the times td(0)-td (4) are 8 µs, 5 µs, 1 µs, and 5 µs, respectively. The voltage table Tvd stores the voltage values Vd(X) associated with the addresses X. In the present embodiment, the voltage values Vd(0)-Vd(4) are 0, V1, V2, V1 and 0, respectively.

The CPU 51*a* causes the memory 55*a* to output the times of the time table Tta to the counter 56*a* in the order of the address, and outputs the voltages of the voltage table Tva stored in the memory to the selecting circuit 60 and the comparing circuit 57 in the order of the address. For example, the address X is stored in the memory 55*a* as a parameter. The CPU 51*a* sets zero (0) to the address X. Then, the CPU 51*a* refers to the address "0" and outputs the time ta(0) of the time table Tta (i.e., 2 µs) stored in the memory 55*a* to the counter 56*a*. The counter 56*a*, to which the time ta(0) is input, outputs a comparison timing signal Sa to the comparing circuit 57. The counter 56*a* measures the input time 2 µs, and after having measured the time 2 µs, outputs an address increment signal Spa to the memory 55*a*. Upon receipt of the address increment signal Spa, the CPU 51*a* increments the address X stored in the memory 55*a* by one. Then, the CPU 51*a* refers to the incremented address "1" in the memory 55*a* and outputs the time ta(1) of the time table Tta (i.e., 1 µs) from the memory 55*a* to the counter 56*a*. The counter 56*a*, to which the time ta(1) is input, outputs the comparison timing signal Sa to the comparing circuit 57. In this way, every time when the time ta(X) is input from the time table Tta to the counter 56*a*, the counter 56*a* outputs the comparison timing signal Sa to the comparing circuit 57, and every time when the counter has measured the time ta(X), the counter 56*a* outputs the address increment signal Spa to the memory 55*a*.

When the CPU 51*a* sets the address X to zero (0), the CPU 51*a* causes the memory 55*a* to output the voltage value Va(0) of the voltage table Tva (i.e., "0") to the selecting circuit 60 and the comparing circuit 57. Thereafter, the CPU 51*a* increments the address X stored in the memory 55*a* by one when the signal Spa is input, and outputs the voltage value Va(1), that is, V1 from the memory 55*a* to the selecting circuit 60 and the comparing circuit 57. In this way, when the address X is set to zero (0), or every time when the address increment signal Spa is input, the CPU 51*a* causes the memory 55*a* to output the voltage value of the voltage table Tva to the selecting circuit 60 and the comparing circuit 57. That is, the CPU 51*a* causes the memory 55*a* to output the voltage values in the voltage table Tva to the selecting circuit 60 and the comparing circuit 57 in the order of address.

Similarly, the CPU 51*a* causes the memories 55*b*-55*d* to output times tb(X)-td(X) of the time tables Ttb-Ttd to the counters 56*b*-56*d* in the order of the addresses, respectively, and the counters 56*b*-56*d* outputs the comparing timing signals Sb-Sd every time when the times tb(X)-td(X) are input, respectively. The counters 56*b*-56*d* output the address increment signals Spb-Spd to the memory 55*a* every time a time corresponding to the address X elapses.

Further, similarly, when the address X is set to zero (0) or when the address increment signals Spb-Spd are input, the CPU 51*a* causes the memories 55*b*-55*d* to output the voltage values Vb(X)-Vd(X) of the voltage tables Tvb-Tbd to the selecting circuit 60 and the comparing circuit 57, respectively. That is, the CPU 51*a* causes the memories 55*b*-55*d* to output the voltage values Vb(X)-Vd(X) to the selecting circuit 60 and the comparing circuit 57 in the order of the addresses.

Figure 6A:
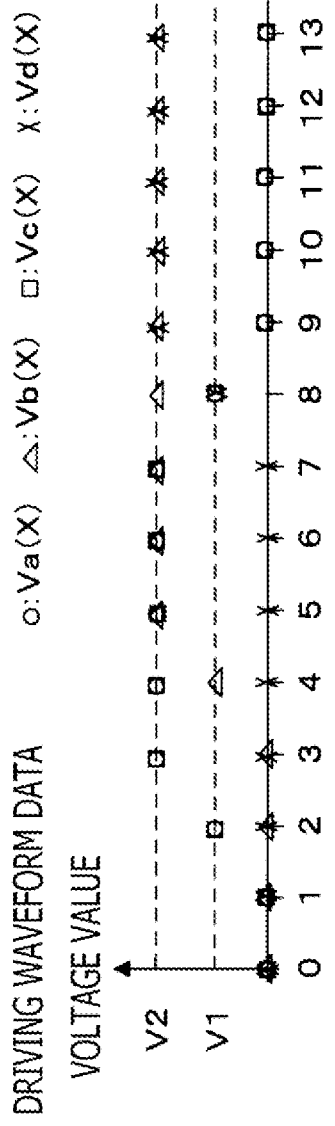
FIG. 6A is a graph plotting drive waveform data Da-Dd for one period over time.

FIG. 6A is a graph plotting drive waveform data Da-Dd for one period over time, in which a horizontal axis represents a time (µs) and a vertical axis represents a voltage value. Circles indicate voltage values Va(X) in the voltage table Tva, triangles indicate voltage values Vb(X) in the voltage table Tvb, squares indicate voltage values Vc(X) in the voltage table Tvc, and crosses indicate voltage values Vd(X) in the voltage table Tvd. FIG. 6A plots the above symbols (i.e., the circles, triangles, squares and crosses) for every 1 µs, corresponding to the time in the time tables. In the following description, when times of plotting are referred to, the unit (i.e., µs) will occasionally be omitted). FIG. 6A shows 20 plots, from time 0 to time 19. It is noted that the voltage value at time k (k=0, 1, 2, . . . , 19) represents the voltage value between time k µs and time (k+1)µs. In FIG. 6A, a time period from time 0 to time 20, i.e., 20 µs, is one cycle of the time-division multiplex signal. In the following description, a time period from the time k to time (k+1) will also be referred to as a particular time period.

Figure 6B:
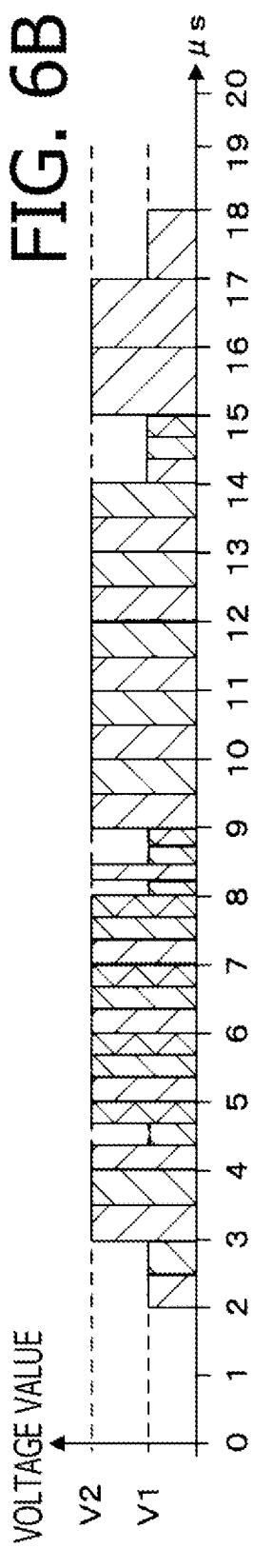
FIG. 6B is a graph showing a time-division multiplex signal.

FIG. 6B is a graph showing a time-division multiplex signal based on the drive waveform data Da-Dd. FIG. 6C and FIGS. 7A-7C are graphs respectively showing synchronization signals A-D. The synchronization signals are pulse waves, each having a high level (H) period and a low level (L) period. A pulse width of the high level (H) period may be shorter than the assigned time.

The details of time-division multiplex signals will now be explained. When the actuator 88 is driven, the control circuit 51 accesses the memory 55, obtains the drive waveform data Da, Db, Dc and Dd, and generates time series data. The time series data are the data Ak, Bk, Ck, and Dk, arranged in order with a time interval Δt in between the data, A0, B0, C0, D0, A1, B1, C1, D1 . . . , Ak, Bk, Ck, Dk. The time series data is represented by digital signals. It is noted that a time interval Δt is an inverse of a particular sampling frequency. The quantized data Ak, Bk, Ck, Dk are arranged in the order A0, B0, C0, D0, A1, B1, C1, D1 . . . , Ak, Bk, Ck, Dk for each time corresponding to the inverse of the particular sampling frequency. In other words, the data length of each of the quantized data Ak, Bk, Ck, and Dk is less than or equal to the length corresponding to the inverse of the particular sampling frequency.

Furthermore, the quantized data A0 and the quantized data B0 are contiguous, the quantized data B0 and the quantized data C0 are contiguous, and the quantized data C0 and the quantized data D0 are contiguous. In other words, between the quantized data A0 and the quantized data B0, there is no quantized data C0, quantized data D0, other quantized data or other waveform data. Furthermore, between the quantized data B0 and the quantized data C0, there is no quantized data A0, quantized data D0, other quantized data or other waveform data. Furthermore, between the quantized data C0 and the quantized data D0, there is no quantized data A0, quantized data B0, other quantized data or other waveform data.

The control circuit 51 outputs the time series data to the D/A converter 52. As shown in FIG. 3, the D/A converter 52 converts the time series data to analog signals and output the same to the amplifier 53. The amplifier 53 amplifies the input analog signal and outputs the same to the switch group 54. As shown in FIG. 3, the analog signal amplified by the amplifier 53 constitutes a time-division multiplex signal. In the time-division multiplex signal, when the part corresponding to data Ak-1 is referred to as the first part, the part corresponding to data Ak is referred to as the second part, the part corresponding to data Bk-1 is referred to as the third part, and the part corresponding to data Bk is referred to as the fourth part, the first part is between the first and second parts, the third part is between the third and fourth parts, the third part is located between the third part and the fourth part, and the second part is located between the third part and the fourth part.

The same relationship exists between the data Bk and Ck, the same relationship exists between the data Ck and Dk, and the same relationship exists between the data Dk and Ak. In other words, the first part and the third part are contiguous, the third part and the second part are contiguous, and the second part and the fourth part are contiguous. That is, in the time-division multiplex signal, between the first and third parts, there is no second part, fourth part, or other waveforms. Further, in the time-division multiplex signal, there is no first part, fourth part, or other waveforms between the third part and the second part. Furthermore, in the time-division multiplex signal, there is no first part, third part, and other waveforms between the second part and the fourth part. It is noted that the control circuit (control circuit) 51, D/A converter 52, amplifier 53, and memory 55 constitute a signal generator.

Figure 8:
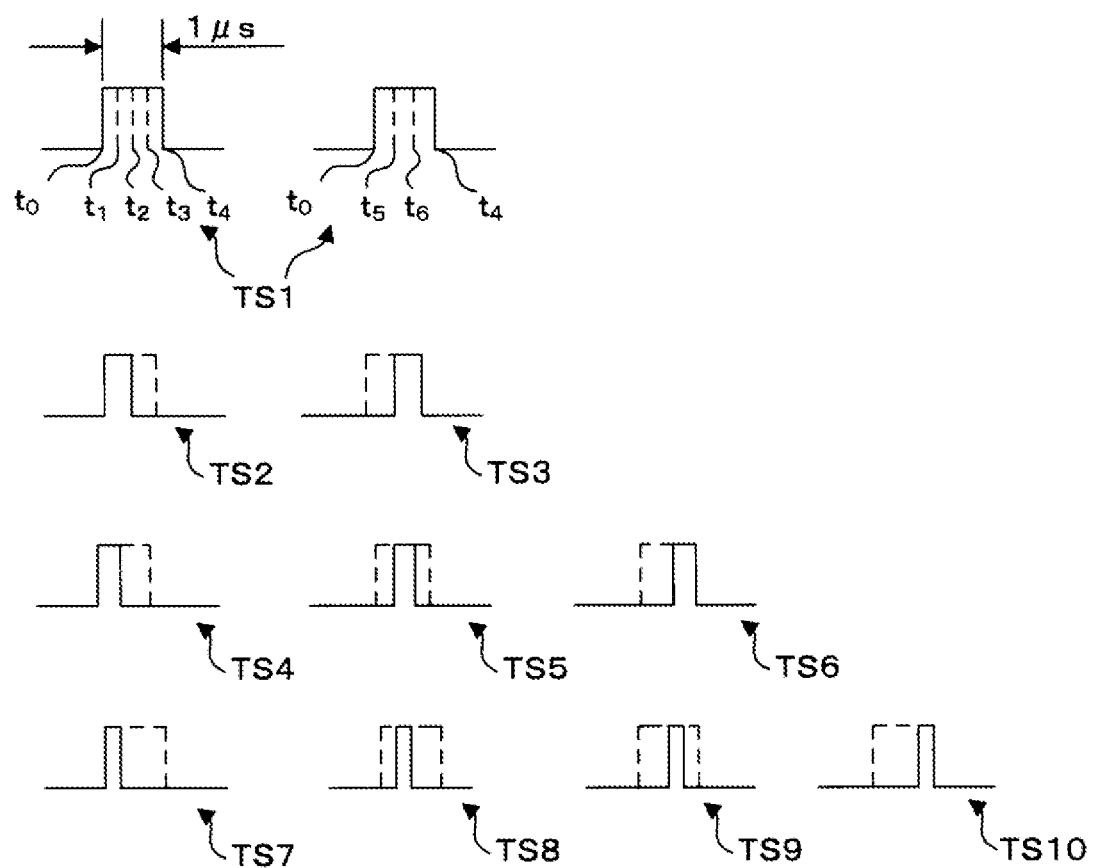
FIG. 8 illustrates time slots.

FIG. 8 shows time slots TS1-TS10 having pulse-like shapes. The time slots TS1 to TS10 have high level periods and low level periods, where the high level period corresponds to a time when the nth switch 54(n) is closed, while the low level period corresponds to a time when the nth switch 54(n) is opened. In FIG. 8, as one pattern, there is shown one time slot which is divided into four equal parts, with the start point of one time slot as t0 and the end point as t4, separated by time points t1, t2, and t3. Further, as another pattern, there is shown a time slot with t0 as the start point and t4 as the end point, and one time slot is divided into three equal parts at time points t5 and t6.

As shown in FIG. 8, the time slot TS1 has a high level period from time t0 to t4 and no low level period, the time slot TS2 has a high level period from time t0 to t2 and a low level period from time t2 to t4, the time slot TS3 has a high level period from time t2 to t4 and no low level period from time t0 to t2, and the time slot TS4 has a high level period from time t2 to t4 and no low level period from t0 to t2. The time slot TS3 is a high level period from time t2 to t4 and a low level period from time t0 to t2. The time slot TS5 is a high level period from time t5 to t6, and a low level period from time t0 to t5 and from time t6 to t4. The time slot TS6 is a high level period from time t6 to t4 and a low level period from time t0 to t6. The time slot TS8 is a high level period from t1 to t2 and a low level period from t0 to t1 and from t2 to t4. The time slot TS9 is a high level period from time t2 to t3 and a low level period from time t0 to t2 and from t3 to t4 and a low level period from time t0 to t3.

The time slots TS1 to TS10 are classified into time slots corresponding to four sampling frequencies that differ from each other. The time slot TS1 corresponds to the first sampling frequency, the time slots TS2 and TS3 correspond to the second sampling frequency, the time slots TS4 to TS6 correspond to the third sampling frequency, and the time slots TS7 to TS10 correspond to the fourth sampling frequency. For example, when the fourth sampling frequency corresponds to 24 MHz, the third sampling frequency corresponds to 18 MHz, the second sampling frequency corresponds to 12 MHz, and the first sampling frequency corresponds to 6 MHz.

When any of the comparison timing signals Sa-Sd is input to the comparing circuit 57, the comparing circuit 57 compares voltages values input from the voltage value tables Tva-Tvd. Timings at which any of the comparison timing signals Sa-Sd is input to the comparing circuit 57 are times 0, 2, 3, 4, 5, 8, 9, 14, 15, 17 and 18 in FIG. 6A.

The comparing circuit 57 assigns one time slot to each of the voltage values which is larger than a particular voltage (in this embodiment, 0V) at every elapse of time k to time (k+1), that is, at every particular time period. Each voltage value corresponds to the drive waveform. In other words, the comparing circuit 57 selects, within the particular time period, drive waveforms which are larger than 0V, and assigns a time slot to each of the selected drive waveforms. Times of the time slots are assigned are different from each other. It is noted that, when none of the comparison timing signals Sa-Sd is input to the comparing circuit 57, that is, at times 1, 6, 7, 10, 11, 12, 13, 16 and 19 in FIG. 6A, the time slot same as the one assigned to the previous time is assigned to the same voltage value. In the following description, the term "time slot" will be referred to as an assigned time.

The smaller the number of the voltage values greater than 0V, i.e., the smaller the number of the selected drive waveforms within the particular time period, the longer the assigned time slot, i.e., the longer the pulse width of the synchronization signal. In other words, the control circuit 51 increases an assigned time period, in the particular time period, assigned per the selected drive waveforms as the number of the selected drive waveforms decreases. For example, when the number of the selected drive waveforms is four, the time slots TS7, TS8, TS9 and TS10 are assigned to the four drive waveforms, respectively. In this case, the length of each of the time slots TS7, TS8, TS9 and TS10 is ¼ μs. When the number of the selected drive waveforms is three, the time slots TS4, TS5 and TS6 are assigned to the three drive waveforms, respectively. In this case, the length of each of the time slots TS4, TS5 and TS6 is ⅓ μs. When the number of the selected drive waveforms is two, the time slots TS2 and TS3 are assigned to the two drive waveforms, respectively. In this case, the length of each of the time slots TS2 and TS3 is ½ μs. When the number of the selected drive waveforms is one, the time slot TS1 is assigned to the one drive waveform. In this case, the length of the time slots TS1 is 1 μs. Thus, when the number of kinds of data indicating the selected drive waveforms is plural, the pulse width is shorter than the particular time period.

The comparing circuit 57 associates the time slots with respective voltage values Va(X)-Vd(X), and outputs the same to the switching circuit 59 and respective synchronization signal generating circuits 62a-62d. The frequency generating circuit 58 generates a signal having a reference frequency (in this embodiment, 24 MHz) and outputs the same to the switching circuit 59 and respective synchronization signal generating circuits 62a-62d.

For example, as shown in FIG. 6A, each of the voltage values Va(X)-Vd(X) at time 0 is zero (0). At time 0, the comparing circuit 57 generating a signal associating the time slot TS1 with the voltage value zero (0), and outputs the same to the switching circuit 59 and each of the synchronization signal generating circuits 62a-62d. For the voltage value 0, the switching circuit 59 generates a signal having a frequency of 6 MHz based on the reference frequency and the time slot TS1. Then, the switching circuit 59 generates a signal associating the time slot TS1 with the frequency of 6 MHz and the voltage value Va(X), and outputs the same to the selecting circuit 60. It is noted that a time for F times the period of the frequency of 6 MHz is 1 μs.

At time 0, the switching circuit 59 generates a signal associating the time slot TS1 with the frequency of 6 MHz and the voltage value of zero (0), and outputs the same to the selecting circuit 60. As shown in FIG. 6B, the selecting circuit 60 refers to the voltage value of zero (0) input from the switching circuit 59, and generates a signal having the voltage value of zero (0) during a period for F times of a period of a 6 MHz signal, that is, from time 0 to time 1 μs. In other word, drive waveforms of which voltage is the particular value (i.e., zero) or less are not selected, and thus, not included in the time-division multiplex signal.

As shown in FIG. 6A, at time 2, the voltage values Va(X) and Vc(X) are V1, and the voltage values Vb(X) and Vd(X) are 0. At time 2, the comparing circuit 57k selects the voltages Va(X) and Vc(X), associates the time slot TS2 with the voltage value Va(X), associates the time slot TS3 with the voltage value Vc(X), and outputs the same to the switching circuit 59 and the synchronization signal generating circuits 62a-62d. For the voltage value Va(X), the switching circuit 59 generates a signal having a frequency of 12 MHz based the reference frequency and the time slot TS2. Further, for the voltage value Vc(X), the switching circuit 59 generates a signal having a frequency of 12 MHz based on the reference frequency and the time slot TS3. The switching circuit 59 associates the time slot TS2, the frequency of 12 MHz, and the voltage value Va(X), and outputs the same to the selecting circuit 60. Further, the switching circuit 59 associates the time slot TS3, the frequency of 12 MHz, and the voltage value Vc(X), and outputs the same o the selecting circuit 60. It is noted that a time for F times the period of the frequency of 12 MHz is 0.5 μs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V1 for a period corresponding to F times a period of 12 MHz signal, that is from time 2 to time 2.5 μs. Further, referring to the voltage value Vc(X) input from the switching circuit 59, the selecting circuit 60 selects the voltage value Vc(X) from among the four voltage values Va(X)-Vd(X) input from the voltage table Tva-Tvd, and generates a signal of which voltage value is V1 for a period corresponding to F times a period of 12 MHz signal, that is from time 2.5 to time 3.0 μs. In other words, only the drive waveforms of which voltage value is greater than the particular value (i.e., 0V) are selected, and the time-division multiplex signal is generated.

As shown in FIG. 6A, at time 3, the voltage values Va(X) and Vc(X) are V2 and the voltage values Vb(X) and Vd(X) are 0. At time 3, the comparing circuit 57 selects the voltages Va(X) and Vc(X), generates a signal associating the time slot TS2 with the voltage value Va(X) and associating the time slot TS3 with the voltage value Vc(X), and outputs the same to the switching circuit 59 and the synchronization signal generating circuits 62a-62d. For the voltage value Va(X), the switching circuit 59 generates a signal having a frequency of 12 MHz based the reference frequency and the time slot TS3. Further, for the voltage value Vc(X), the switching circuit 59 generates a signal having a frequency of 12 MHz based on the reference frequency and the time slot TS3. The switching circuit 59 generates a signal associating the time slot TS2, the frequency of 12 MHz, and the voltage value Va(X), and outputs the same to the selecting circuit 60. Further, the switching circuit 59 associates the time slot TS3, the frequency of 12 MHz, and the voltage value Vc(X), and outputs the same o the selecting circuit 60. It is noted that a time for F times the period of the frequency of 12 MHz is 0.5 μs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V2 for a period corresponding to F times a period of 12 MHz signal, that is, from time 3 to time 3.5 µs. Further, referring to the voltage value Vc(X) input from the switching circuit 59, the selecting circuit 60 selects the voltage value Vc(X) from among the four voltage values Va(X)-Vd(X) input from the voltage table Tva-Tvd, and generates a signal of which voltage value is V2 for a period corresponding to F times a period of 12 MHz signal, that is from time 3.5 to time 4.0 µs. In other words, only the drive waveforms of which voltage values are greater than the particular value (i.e., 0V) are selected, and the time-division multiplex signal is generated.

As shown in FIG. 6A, at time 4, the voltage values Va(X) and Vc(X) are V2 and the voltage values Vb(X) and Vd(X) are 0. At time 4, the comparing circuit 57 associates the time slot TS4 with the voltage value Va(X), associates the time slot TS5 with the voltage value Vb(X), associates the time slot TS6 with the voltage value Vc(X), and outputs the same to the switching circuit 59 and the synchronization signal generating circuits 62a-62d. For the voltage value Va(X), the switching circuit 59 generates a signal having a frequency of 18 MHz based the reference frequency and the time slot TS4. Further, for the voltage value Vb(X), the switching circuit 59 generates a signal having a frequency of 18 MHz based on the reference frequency and the time slot TS5. Furthermore, for the voltage value Vc(X), the switching circuit 59 generates a signal having a frequency of 18 MHz based on the reference frequency and the time slot TS6. The switching circuit 59 associates the time slot TS4, the frequency of 18 MHz, and the voltage value Va(X), and outputs the same to the selecting circuit 60. Further, the switching circuit 59 associates the time slot TS5, the frequency of 18 MHz, and the voltage value Vb(X), and outputs the same o the selecting circuit 60. Furthermore, the switching circuit 59 associates the time slot TS6, the frequency of 18 MHz, and the voltage value Vc(X), and outputs the same o the selecting circuit 60. It is noted that a time for F times the period of the frequency of 18 MHz is ⅓ µs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V2 for a period corresponding to F times a period of 18 MHz signal, that is, from time 4 to time (4+⅓) µs. Further, referring to the voltage value Vb(X) input from the switching circuit 59, the selecting circuit 60 selects the voltage value Vb(X) from among the four voltage values Va(X)-Vd(X) input from the voltage table Tva-Tvd, and generates a signal of which voltage value is V1 for a period corresponding to F times a period of 18 MHz signal, that is from time (4+⅓) to time (4+⅔) µs. Furthermore, referring to the voltage value Vc(X) input from the switching circuit 59, the selecting circuit 60 selects the voltage value Vc(X) from among the four voltage values Va(X)-Vd(X) input from the voltage table Tva-Tvd, and generates a signal of which voltage value is V2 for a period corresponding to F times a period of 18 MHz signal, that is from time (4+⅔) to time 5 µs. In other words, only the drive waveforms of which voltage values are greater than the particular value (i.e., 0V) are selected, and the time-division multiplex signal is generated.

As shown in FIG. 6A, at time 5, the voltage values Va(X)-Vc(X) are V2 and the voltage value Vd(X) is 0. At time 5, the comparing circuit 57 associates the time slot TS4 with the voltage value Va(X), associates the time slot TS5 with the voltage value Vb(X), associates the time slot TS6 with the voltage value Vc(X), and outputs the same to the switching circuit 59 and the synchronization signal generating circuits 62a-62d. For the voltage value Va(X), the switching circuit 59 generates a signal having a frequency of 18 MHz based the reference frequency and the time slot TS4. Further, for the voltage value Vb(X), the switching circuit 59 generates a signal having a frequency of 18 MHz based on the reference frequency and the time slot TS5. Furthermore, for the voltage value Vc(X), the switching circuit 59 generates a signal having a frequency of 18 MHz based on the reference frequency and the time slot TS6. The switching circuit 59 associates the time slot TS4, the frequency of 18 MHz, and the voltage value Va(X), and outputs the same to the selecting circuit 60. Further, the switching circuit 59 associates the time slot TS5, the frequency of 18 MHz, and the voltage value Vb(X), and outputs the same o the selecting circuit 60. Furthermore, the switching circuit 59 associates the time slot TS6, the frequency of 18 MHz, and the voltage value Vc(X), and outputs the same o the selecting circuit 60. It is noted that a time for F times the period of the frequency of 18 MHz is ⅓ µs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V2 for a period corresponding to F times a period of 18 MHz signal, that is, from time 5 to time (5+⅓) µs. Further, referring to the voltage value Vb(X) input from the switching circuit 59, the selecting circuit 60 selects the voltage value Vb(X) from among the four voltage values Va(X)-Vd(X) input from the voltage table Tva-Tvd, and generates a signal of which voltage value is V2 for a period corresponding to F times a period of 18 MHz signal, that is from time (5+⅓) to time (5+⅔) µs. Furthermore, referring to the voltage value Vc(X) input from the switching circuit 59, the selecting circuit 60 selects the voltage value Vc(X) from among the four voltage values Va(X)-Vd(X) input from the voltage table Tva-Tvd, and generates a signal of which voltage value is V2 for a period corresponding to F times a period of 18 MHz signal, that is from time (5+⅔) to time 6 µs. In other words, only the drive waveforms of which voltage values are greater than the particular value (i.e., 0V) are selected, and the time-division multiplex signal is generated.

As shown in FIG. 6A, at time 8, the voltage values Va(X), Vc(X) and Vd(X) are V2 and the voltage value Vc(X) is V2. At time 8, the comparing circuit 57 associates the time slot TS7 with the voltage value Va(X), associates the time slot TS8 with the voltage value Vb(X), associates the time slot TS9 with the voltage value Vc(X), associates the time slot T10 with the voltage value Vd(X), and outputs the same to the switching circuit 59 and the synchronization signal generating circuits 62a-62d. For the voltage value Va(X), the switching circuit 59 generates a signal having a frequency of 24 MHz based the reference frequency and the time slot TS7. Further, for the voltage value Vb(X), the switching circuit 59 generates a signal having a frequency of 24 MHz based on the reference frequency and the time slot TS8. Furthermore, for the voltage value Vc(X), the switching circuit 59 generates a signal having a frequency of 24 MHz based on the reference frequency and the time slot TS9. Furthermore, for the voltage value Vd(X), the switching circuit 59 generates a signal having a frequency of 24 MHz based on the reference frequency and the time slot TS10. The switching circuit 59 associates the time slot TS7, the frequency of 24 MHz, and the voltage value Va(X), and outputs the same to the selecting circuit 60. Further, the switching circuit 59 associates the time slot TS8, the frequency of 24 MHz, and the voltage value Vb(X), and outputs the same to the selecting circuit 60. Furthermore, the switching circuit 59 associates the time slot TS9, the frequency of 24 MHz, and the voltage value Vc(X), and outputs the same to the selecting circuit 60. Furthermore, the switching circuit 59 associates the time slot TS10, the frequency of 24 MHz, and the voltage value Vd(X), and outputs the same to the selecting circuit 60. It is noted that a time for F times the period of the frequency of 24 MHz is ¼ µs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V1 for a period corresponding to F times a period of 24 MHz signal, that is, from time 8 to time (8+¼) ∞s. Further, referring to the voltage value Vb(X) input from the switching circuit 59, the selecting circuit 60 selects the voltage value Vb(X) from among the four voltage values Va(X)-Vd(X) input from the voltage table Tva-Tvd, and generates a signal of which voltage value is V2 for a period corresponding to F times a period of 24 MHz signal, that is from time (8+¼) to time (8+2/4) µs. Furthermore, referring to the voltage value Vc(X) input from the switching circuit 59, the selecting circuit 60 selects the voltage value Vc(X) from among the four voltage values Va(X)-Vd(X) input from the voltage table Tva-Tvd, and generates a signal of which voltage value is V1 for a period corresponding to F times a period of 24 MHz signal, that is from time (8+2/4) to time (8+¾) µs. Furthermore, referring to the voltage value Vd(X) input from the switching circuit 59, the selecting circuit 60 selects the voltage value Vd(X) from among the four voltage values Va(X)-Vd(X) input from the voltage table Tva-Tvd, and generates a signal of which voltage value is V1 for a period corresponding to F times a period of 24 MHz signal, that is from time (8+¾) to time 9 µs. In other words, only the drive waveforms of which voltage values are greater than the particular value (i.e., 0V) are selected, and the time-division multiplex signal is generated.

As shown in FIG. 6A, at time 9, the voltage values Vb(X) and Vd(X) are V2 and the voltage values Va(X) and Vc(X) are zero (0). At time 9, the comparing circuit 57 selects the voltages Vb(X) and Vd(X), associates the time slot TS2 with the voltage value Vb(X), associates the time slot TS3 with the voltage value Vb(X), and outputs the same to the switching circuit 59 and the synchronization signal generating circuits 62a-62d. For the voltage value Vb(X), the switching circuit 59 generates a signal having a frequency of 12 MHz based on the reference frequency and the time slot TS2. Furthermore, for the voltage value Vd(X), the switching circuit 59 generates a signal having a frequency of 12 MHz based on the reference frequency and the time slot TS3. The switching circuit 59 associates the frequency of 12 MHz with the voltage value Vb(X), and outputs the same to the selecting circuit 60. Further, the switching circuit 59 associates the frequency of 12 MHz with the voltage value Vd(X), and outputs the same to the selecting circuit 60. It is noted that a time for F times the period of the frequency of 12 MHz is 0.5 µs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V2 for a period corresponding to F times a period of 12 MHz signal, that is, from time 9 to time 9.5 µs. Further, referring to the voltage value Va(X) input from the switching circuit 59, the selecting circuit 60 selects the voltage value Vb(X) from among the four voltage values Va(X)-Vd(X) input from the voltage table Tva-Tvd, and generates a signal of which voltage value is V2 for a period corresponding to F times a period of 12 MHz signal, that is, from time 9.5 to time 10 µs. In other words, only the drive waveforms of which voltage values are greater than the particular value (i.e., 0V) are selected, and the time-division multiplex signal is generated.

As shown in FIG. 6A, at time 14, the voltage values Va(X), Vb(X) and Vd(X) are V2 and the voltage value Vc(X) is zero (0). At time 14, the comparing circuit 57 associates the time slot TS4 with the voltage value Va(X), associates the time slot TS5 with the voltage value Vb(X), associates the time slot TS6 with the voltage value Vd(X), and outputs the same to the switching circuit 59 and the synchronization signal generating circuits 62a-62d. For the voltage value Va(X), the switching circuit 59 generates a signal having a frequency of 18 MHz based on the reference frequency and the time slot TS4. Furthermore, for the voltage value Vb(X), the switching circuit 59 generates a signal having a frequency of 16 MHz based on the reference frequency and the time slot TS5. Further, for the voltage value Vd(X), the switching circuit 59 generates a signal having a frequency of 18 kMHz based on the reference frequency and the time slot TS6. It is noted that a time for F times the period of the frequency of 18 MHz is ⅓ µs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V1 for a period corresponding to F times a period of 18 MHz signal, that is, from time 14 to time (14+⅓) µs. Further, referring to the voltage value Vb(X) input from the switching circuit 59, the selecting circuit 60 selects the voltage value Vb(X) from among the four voltage values Va(X)-Vd(X) input from the voltage table Tva-Tvd, and generates a signal of which voltage value is V1 for a period corresponding to F times a period of 18 MHz signal, that is, from time (14+⅓) to time (14+⅔) µs. Furthermore, referring to the voltage value Vd(X) input from the switching circuit 59, the selecting circuit 60 selects the voltage value Vd(X) from among the four voltage values Va(X)-Vd(X) input from the voltage table Tva-Tvd, and generates a signal of which voltage value is V1 for a period corresponding to F times a period of 18 MHz signal, that is, from time (14+⅔) to time 15 µs. In other words, only the drive waveforms of which voltage values are greater than the particular value (i.e., 0V) are selected, and the time-division multiplex signal is generated.

As shown in FIG. 6A, at time 15, the voltage value Va(X) is V2, and the voltage values Vb(X)-Vd(X) are zero (0). At time 15, the comparing circuit 57 associates the time slot TS1 with the voltage value Va(X) and outputs the same to the switching circuit 59 and the synchronization signal generating circuits 62a-62d. For the voltage value Va(X), the switching circuit 59 generates a signal having a frequency of 6 MHz based on the reference frequency and the time slot TS1. The switching circuit 59 associates the time slot TS1, a frequency of 6 MHz and the voltage value Va(X), and outputs the same to the selecting circuit 60. It is noted that a time for F times the period of the frequency of 6 MHz is 1 μs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V2 for a period corresponding to F times a period of 6 MHz signal, that is, from time 15 to time 16 μs. In other words, only the drive waveforms of which voltage values are greater than the particular value (i.e., 0V) are selected, and the time-division multiplex signal is generated.

As shown in FIG. 6A, at time 17, the voltage value Va(X) is V1, and the voltage values Vb(X)-Vd(X) are zero. At time 17, the comparing circuit 57 associates the time slot TS1 with the voltage value Va(X) and outputs the same to the switching circuit 59 and the synchronization signal generating circuits 62a-62d. For the voltage value Va(X), the switching circuit 59 generates a signal having a frequency of 6 MHz based on the reference frequency and the time slot TS1. The switching circuit 59 associates the time slot TS1, a frequency of 6 MHz and the voltage value Va(X), and outputs the same to the selecting circuit 60. It is noted that a time for F times the period of the frequency of 6 MHz is 1 μs.

As shown in FIG. 6B, referring to the voltage value Va(X) input from the switching circuit 59, the selecting circuit 60 selects the voltage value Va(X) from among the four voltage values Va(X)-Vd(X) input from the voltage table Tva-Tvd, and generates a signal of which voltage value is V1 for a period corresponding to F times a period of 6 MHz signal, that is, from time 17 to time 18 μs. In other words, only the drive waveforms of which voltage values are greater than the particular value (i.e., 0V) are selected, and the time-division multiplex signal is generated.

As shown in FIG. 6A, at time 18, the voltage values Va(X)-Vd(X) are zero (0). At time 18, the comparing circuit 57 associates the time slot TS1 with the voltage value 0, and outputs the same to the switching circuit 59 and the synchronization signal generating circuits 62a-62d. For the voltage value 0, the switching circuit 59 generates a signal having a frequency of 6 MHz based on the reference frequency and the time slot TS1. The switching circuit 59 associates the time slot TS1, a frequency of 6 MHz and the voltage value Va(X), and outputs the same to the selecting circuit 60. It is noted that a time for F times the period of the frequency of 6 MHz is 1 μs.

The switching circuit 59 associates the time slot TS1, the frequency of 6 MHz and the voltage value 0, and outputs the same to the selecting circuit 60. As shown in FIG. 6B, the selecting circuit 60 refers to the voltage value 0 input from the switching circuit 59, and generates a signal having a frequency of 6 MHz and having the voltage value 0 for a period corresponding to F times a period of 6 MHz signal, that is, from time 0 to time 1 μs. In other words, the drive waveforms of which voltage values are less than the particular value (i.e., 0V) are not selected, and is not included in the time-division multiplex signal.

The selecting circuit 60 outputs the generated signals to the multiplexed signal output circuit 61, which outputs the time-division multiplex signal (see FIG. 6B) to the D/A converter 52. As shown in FIG. 3, the time-division multiplex signal is amplified by the amplifier 53 and input into multiple n-th switches 54(n).

As described above, the drive waveforms of which voltages are greater than the particular value (i.e., 0V) are selected and the time-division multiplex signals are generated. Therefore, as shown in FIG. 6B, during a period from time 2 μs to time 18 μs, only signals of which voltages are greater than 0V are included, while signals of which voltage is 0V is not included in the time-division multiplex signals. Therefore, in the time-division multiplex signals, time periods can be reduced. Conventionally, the time-division multiplex signal is configured such that the signal of 0V is included in a time period in which the signals of 1V or 2V are included, and a width of the signals of which voltages are greater than 0V is relatively narrow. According to the present disclosure, the time-division multiplex signal does not include the signal of which voltage is 0V in the period where the signals of which voltages are 1V or 2V are included. Therefore, the width of each signal greater than 0V that constitutes a time-division multiplex signal can be made as wide as possible to improve the reproducibility of the drive waveform when reproducing a desired drive waveform (drive waveform) from the time-division multiplex signal. It is noted that, in a period from time 0 to time 2 μs, and from time 18 to time 20 μs, the signal of which voltage is other than 0V is not included. Accordingly, the signal of which voltage is 0V is included in the time-division multiplex signal.

As described above, the frequency generating circuit 58 outputs the reference frequency to each of the synchronization signal generating circuits 62a-62d, and the comparing circuit 57 associates the time slots to respective voltages Va(X)-Vd(X), and outputs the same to each of the synchronization signal generating circuits 62a-62d.

Figure 6C:
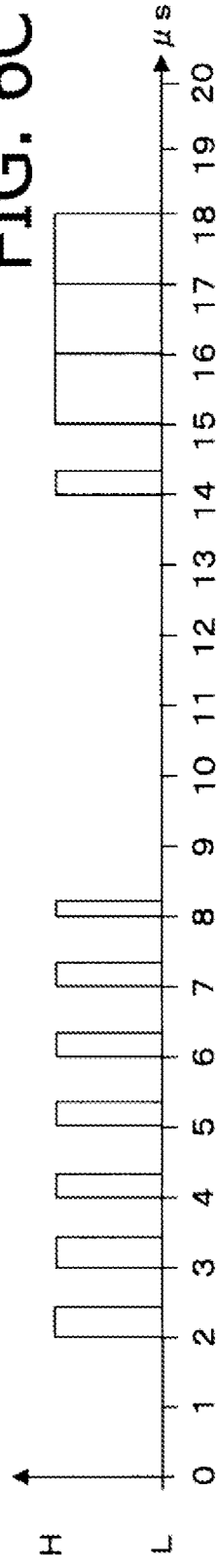
FIG. 6C is a graph indicating a synchronization signal A.

As shown in FIG. 6C, the synchronization signal generating circuit 62a refers to the time slot associated with the voltage value Va(X), and generates a synchronization signal A. The time slot associated with the voltage value Va(X) does not exist between time 0 to time 2 μs. That is, the synchronization signal A is in a low-level state within a period from time 0 to time 2 μs. It is noted that, within the period from time 0 to time 2 μs, the time slot associated with the voltage values Va(X)-Vd(X) may be the time slot TS1.

During a period from time 2 to 3 μs, the time slot associated with the voltage value Va(X) is the time slot TS2. The synchronization signal A is in a high-level state during a period from time 2 to 2.5 μs, while the synchronization signal A is in a low-level state during a period from time 2.5 to 3 μs. During a period from time 3 to time 4, the time slot is TS2, the synchronization signal A is in the high-level state during a period from time 3 to time 3.5 μs, while the synchronization signal A is in the low-level state during a period from time 3.5 to time 4 μs. During a period from time 4 to time 7, the time slot is TS4, and the synchronization signal A is in the high-level state during a period from time 4 to time (4+⅓) μs, a period from time 5 to time (5+⅓) μs, a period from time 6 to time (6+⅓) μs, and a period from time 7 to time (7+⅓) μs, while the synchronization signal A is in the low-level state during a period from time (4+⅓) to time 5 μs, a period from time (5+⅓) to time 6 μs, a period from time (6+⅓) to time 7 μs, a period from time (7+⅓) to time 8 μs.

At time 8 μs, the time slot is TS7, the synchronization signal A is in the high-level state during a period from time 8 to time (8+¼) μs, while in the low-level state during a period from time (8+¼) to time 9 μs. The synchronization signal A says in the low-level state during a period from time 9 to time 14 μs. At time 14 μs, the time slot is TS4, and the synchronization signal A is in the high-level state during a period from time 14 to time (14+⅓) μs, while in the low-level state during a period from time (14+⅓) to time 15

μs. During a period from time 15 to time 18 μs, the time slot is TS1, and the synchronization signal A is in the high-level state during the period from time 15 to time 18 μs. In other words, the pulse width of the synchronization signal A becomes longer as the length of the time slot is longer.

As shown in FIG. 7A, the synchronization signal generating circuit 62b refers to a time slot associated with the voltage value Vb(X), and generates the synchronization signal B. The synchronization signal B is in the low-level state during a period from time 0 to time 4 μs. The time slot associated with the voltage value Vb(X) is TS5 during a period from time 4 to time 9 μs. The synchronization signal B is in the high-level state during a period from time (k+⅓) to time (k+⅔) μs (where k being an integer from 4 to 8), while in the low-level state during a period from time k to time (k+⅓) and a period from time (k+⅔) to time (k+1) (where k being an integer from 4 to 8).

During a period from time 9 to time 14 μs, the time slot is TS2, the synchronization signal B is in the high-level state during a period from time k1 to (k1+½) μs (where k1 being an integer from 9 to 13), while is in the low-level state during a period from time (k1+½) to time (k1+1) μs (where k1 being an integer from 9 to 13). During a period from time 14 to time 15 μs, the time slot is TS5, the synchronization signal B is in the high-level state during a period from time (14+⅓) to time (14+⅔) μs, while in the low-level state during a period from time 14 to time (14+⅔) μs. The synchronization signal B is in the low-level state during a period from time 15 to time 20 μs. That is, a pulse width of the synchronization signal B is longer as the length of the time slot is longer.

As shown in FIG. 7B, the synchronization signal generating circuit 62c refers to the time slot associated with the voltage value Vc(X), and generates the synchronization signal C. The synchronization signal C is in the low-level state during a period from time 0 to time 2 μs. The time slot associated with the voltage value Vc(X) is TS3 during a period from time 2 to time 4 μs, the synchronization signal C is in the high-state during a period from time (k2+½) to time (k2+1) μs (where k2 being 2 and 3), and the synchronization signal C is the low-level state during a period from time k2 to time (k2+½) μs (where k2 being 2 and 3).

During a period from time 4 to time 8 μs, the time slot TS5, the synchronization signal C is in the high-level state during a period from time (k3+⅔) to time (k3+1) μs (where k3 being an integer from 4 to 7), and in the low-level state during a period from time k3 to (k3+⅔) μs (where k3 being an integer from 4 to 7). During a period from time 8 to time 9 μs, the time slot is TS9, the synchronization signal C is in the high-level state during a period from time (8+½) to time (8+¾) μs, and is in the low-level state during a period from time 8 to time (8+½) and during a period from time (8+¾) to time 9 μs. Further, during a period from time 9 to time 20 μs, the synchronization signal C is in the low-level state. That is, the pulse width of the synchronization signal C is longer as the length of the time slot is longer.

As shown in FIG. 7C, the synchronization signal generating circuit 62d refers to the time slot associated with the voltage value Vd(X), and generates the synchronization signal D. The synchronization signal D is in the low-level state during a period from time 0 to time 8 μs. The time slot associated with the voltage value Vd(X) is TS10 during a period from time 8 to time 8 μs, the synchronization signal D is in the high-state during a period from time (8+¾) to time 9 μs, and the synchronization signal D is in the low-level state during a period from time 8 to time (8+¾) μs.

During a period from time 9 to time 14 μs, the time slot TS3, the synchronization signal D is in the high-level state during a period from time (k4+½) to time (k4+1) μs (where k4 being an integer from 9 to 13), and in the low-level state during a period from time k4 to (k4+½) μs (where k4 being an integer from 9 to 13). During a period from time 14 to time 15 μs, the time slot is TS6, the synchronization signal D is in the high-level state during a period from time (14+⅔) to time 15 μs, and is in the low-level state during a period from time 14 to time (14+⅔) μs. Further, during a period from time 15 to time 20 μs, the synchronization signal D is in the low-level state. That is, the pulse width of the synchronization signal D is longer as the length of the time slot is longer.

The synchronization signal generating circuits 62a-62d respectively output the synchronization signals A-D to the switch group 54. As shown in FIG. 3, the control circuit 51 outputs a switch control signal S1 to control each of multiple switches 54. In the following description, the multiple switches are referred to as the switches 54, while an n-th one of the multiple switches 54 will be referred to as an n-th switch 54(n). The switch control signal S1 contains first selection information indicating one (i.e., n-th) of the multiple switches 54(n) to be selected, and second information indicating one of the four synchronization signals A-D is to be selected. The first information and the second information are associated with each other.

The switch group 54 is configured in such a manner that a selected (i.e., n-th) switch 54(n) is opened/closed at an opening/closing timing indicated by a selected one of the synchronization signals A-D. As described above, since time-division multiplex signals are input to respective ones of the switches 54(n), opening and closing of the n-th switch 54(n) causes the drive waveform corresponding to one of the drive waveform data Da-Dd to be input to the actuator 88.

FIGS. 9A-9D show the drive waveform signals input to the actuator 88 by the opening and closing of the n-th switch 54(n). When the synchronization signal A is selected, the switch group 54 closes the n-th switch 54(n) when the pulse of the synchronization signal A is high level, and opens the n-th switch 54(n) when the pulse of the synchronization signal A is low level. The first and second condensers 89a and 89b retain the charge applied to the individual electrode 85 when the n-th switch 54(n) is closed. In other words, drive waveform signal WA is separated from the time-division multiplex signal based on the synchronization signal A. As shown in FIGS. 9A-9D, the drive waveform signal WA is input to the actuator 88 to drive the actuator 88.

When the synchronization signal B is selected, the switch group 54 closes the n-th switch 54(n) when the pulse of the synchronization signal B is high level, and opens the n-th switch 54(n) when the pulse of the synchronization signal B is low level. The first and second condensers 89a and 89b retain the charge applied to the individual electrode 85 when the n-th switch 54(n) is closed, i.e., the drive waveform signal WB is separated from the time-division multiplex signal based on synchronization signal B. As shown in FIGS. 9A-9D, the drive waveform signal WB is input to the actuator 88 to drive the actuator 88.

When the synchronization signal C is selected, the switch group 54 closes the n-th switch 54(n) when the pulse of the synchronization signal C is high level, and opens the n-th switch 54(n) when the pulse of the synchronization signal C is low level. The first and second condensers 89a and 89b retain the charge applied to the individual electrode 85 when the n-th switch 54(n) is closed, i.e., the drive waveform signal WC is separated from the time-division multiplex signal based on the synchronization signal C. As shown in FIGS. 9A-9D, the drive waveform signal WC is input to the actuator 88 to drive the actuator 88.

When the synchronization signal D is selected, the switch group 54 closes the n-th switch 54(*n*) when the pulse of the synchronization signal D is high level, and opens the n-th switch 54(*n*) when the pulse of the synchronization signal D is low level. The first and second condensers 89*a* and 89*b* retain the charge applied to the individual electrode 85 when the n-th switch 54(*n*) is closed, i.e., the drive waveform signal WD is separated from the time-division multiplex signal. As shown in FIGS. 9A-9D, the drive waveform signal WD is input to the actuator 88 to drive the actuator 88.

When the actuator 88 is driven by the drive waveform signal WA, the size of ink ejected from nozzle 80 is "medium". When the actuator 88 is driven by the drive waveform signal WB, the size of ink ejected from nozzle 80 is "large". When the actuator 88 is driven by the drive waveform signal WC or WD, the size of ink ejected from nozzle 80 is "small". The timing of ink ejection is different depending on whether the actuator 88 is driven by the drive waveform signal WC or WD.

In the printing device according to the present embodiment, the time-division multiplex signals are generated from a plurality of drive waveform data Da-Dd, which represent drive waveforms different from each other. From the generated time-division multiplex signals, one of the drive waveform signals WA-WD corresponding to one of the drive waveforms is separated. The actuator is driven by the thus separated one of the drive waveform signals WA-WD. By separating one of the drive waveform signals WA-WD, the shape of the drive waveform supplied to the actuator 88 can be adjusted. Further, one period of printing one pixel includes only one period of one of the drive waveforms, but not the other drive waveforms. Therefore, the standby time of the 80 nozzles can be reduced.

Further, only drive waveforms of which the amplitude of the voltage is greater than a particular value (0V) are selected and a time-division multiplex signal is generated. In a particular time period, as the number of voltage values of which values are greater than 0V, i.e., the number of selected drive waveforms, is smaller, the time slot allocated, i.e., the allocation time becomes longer. Therefore, a voltage value greater than 0V is assigned to the entirety of each particular time period. In other words, only drive waveforms of which the voltage amplitude is larger than a particular value are selected to generate time-division multiplex signals. As a result, the reproducibility of the drive waveform can be improved.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Hereinafter, a printing device according to a modified embodiment will be described. It is noted that components similar to those in the above-described embodiment are indicated by the same reference numerals, and a description thereof will be omitted/simplified. The printing device according to the modified embodiment is configured to perform a superimpose printing of performing, after first printing on a printing medium, superimposing second printing on an area of the printing medium where the first printing is performed.

Figure 10A:
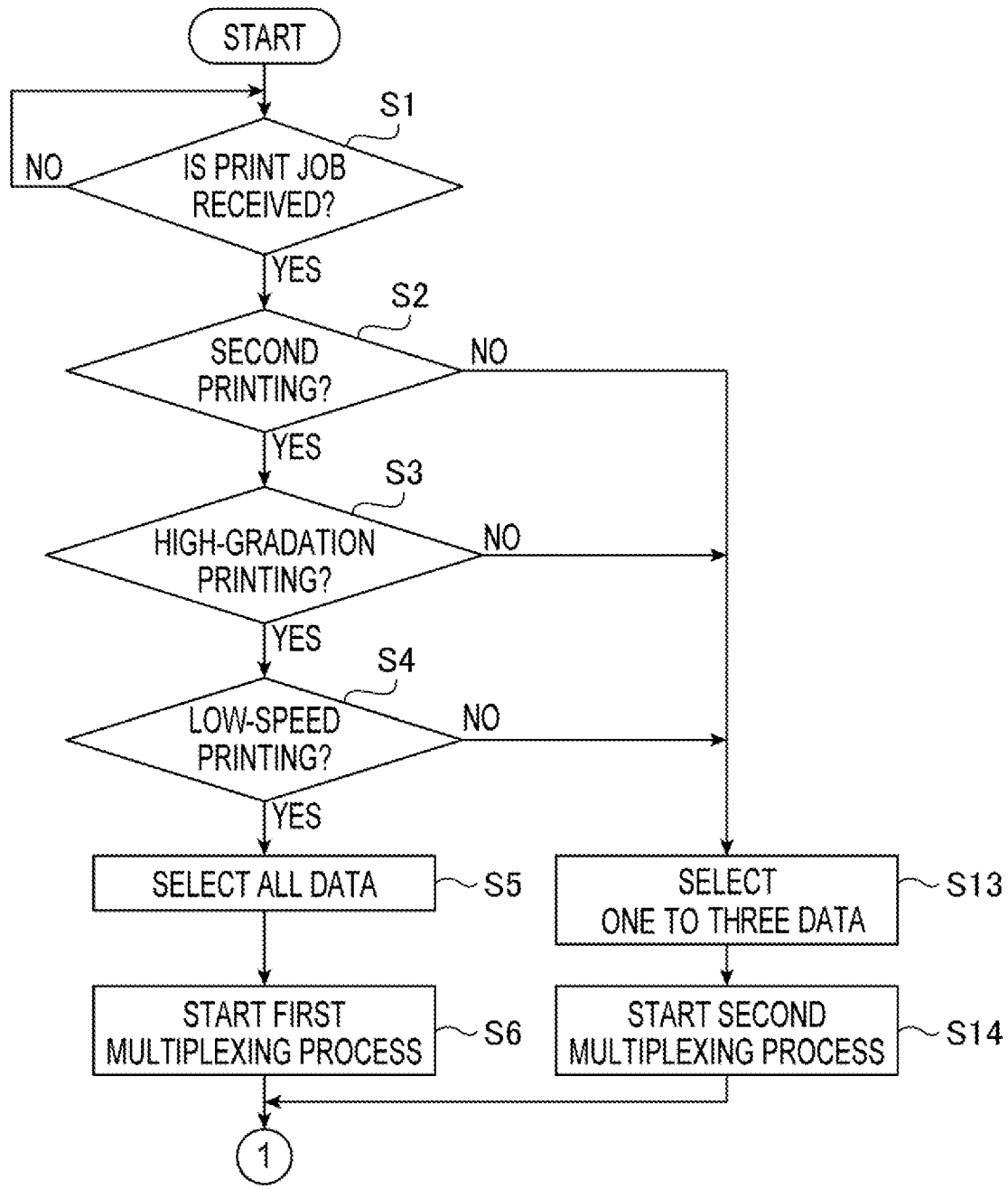
FIGS. 10A and 10B are a flowchart illustrating a printing process performed by a CPU.
Figure 10B:
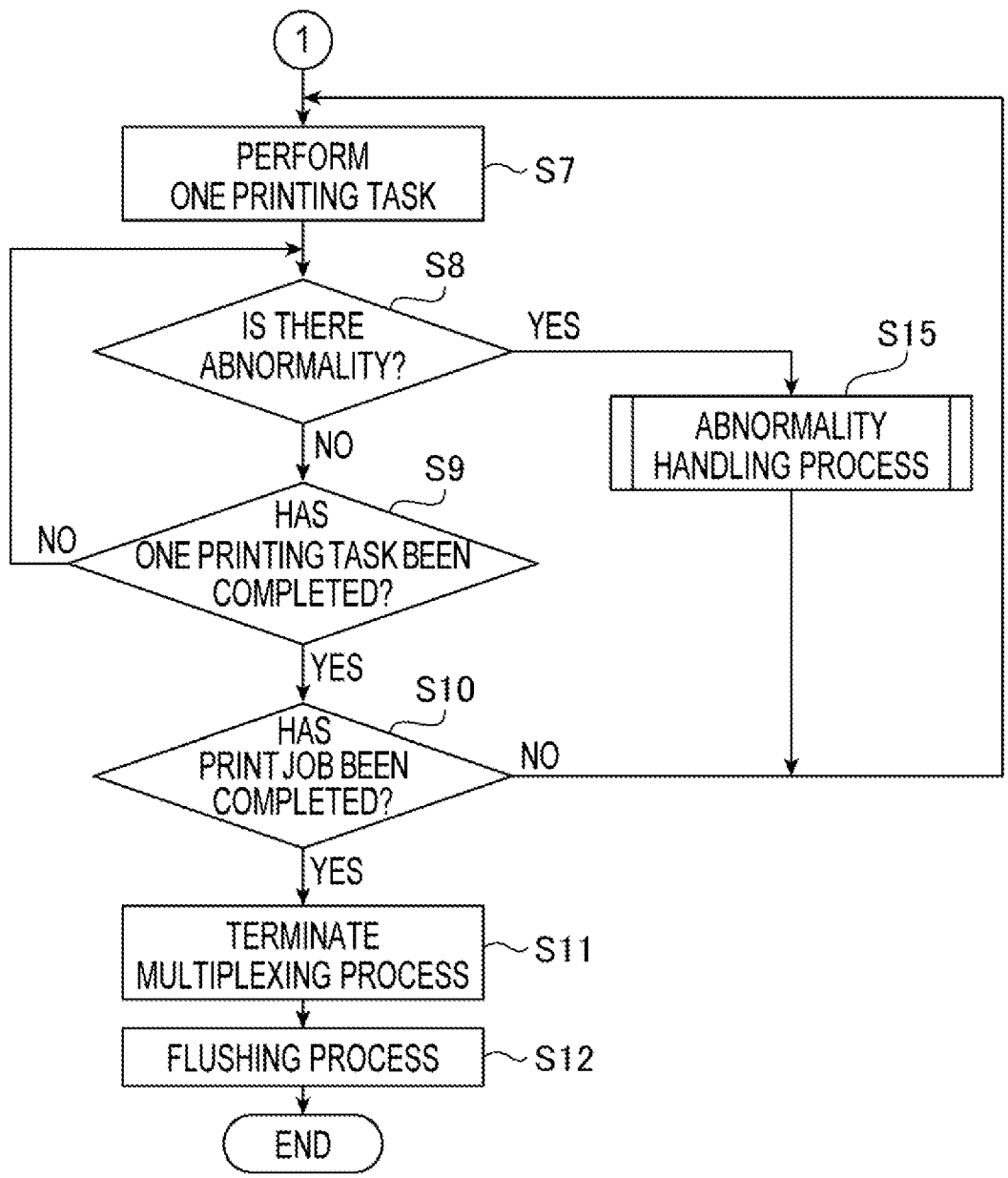

FIGS. 10A and 10B are a flowchart illustrating a printing process performed by a CPU 51*a* according to the modified embodiment.

The CPU 51*a* determines whether a print job is received from an external device 100 (S1). When the print job has not been received (S1: NO), the CPU 51*a* returns to S1. When the print job has been received (S1: YES), the CPU 51*a* determines whether the received print job is the second printing (S2). When the received print job is the second printing (S2: YES), the CPU 51*a* determines whether the received print job is a high-gradation printing (S3). When the print job is the high-gradation printing (S3: YES), the CPU 51*a* determines whether the received print job is a low-speed printing (S4). When the print job is the low-speed printing (S4: YES), the CPU 51*a* selects all the drive waveform data Da-Dd (S5), and starts a first multiplexing process (S6). The first multiplexing process is a process of generating time-division multiplexed signals and separating drive waveform signals from the time-division multiplex signals as shown in the above-described embodiment. In the first multiplexing process, the comparing circuit 57 selects drive waveform data from the multiple drive waveform data selected by the CPU 51*a*, based on the amplitude of the voltage during a particular time period.

The CPU 51*a* performs one print task (S7). A print task is a unit that constitutes a print job. Concretely, the print task is a liquid ejection process that is performed while the inkjet print head 8 moves to the right or left by a right-left width of the printing sheet 200. Next, the CPU 51*a* determines whether there is an abnormality (S8). An abnormality is, for example, a paper jam. When there is an abnormality (S8: YES), the CPU 51*a* performs an abnormality handling process (S15). Details of the abnormality handling process are described later.

When there is no abnormality (S8: NO), the CPU 51*a* determines whether one print task has been completed (S9). It is noted that the carriage 6 performs one scanning in one print task. When one print task has not completed (S9: NO), the CPU 51*a* returns to S8. When one print task has been completed (S9: YES), the CPU 51*a* determines whether the print job has been completed (S10). When the print job has not been completed (S10: NO), the CPU 51*a* returns to S7 and performs next one print task. When the print job has been completed (S10: YES), the CPU 51*a* terminates the first multiplexing process or a second multiplexing process, which will be described later (S11), and performs the flushing process (S12). The flushing process is a process of ejecting ink from the nozzles 80 for a purpose other than printing, and is performed, for example, at the flushing receiver 21. After the flushing process is performed, the CPU 51*a* terminates the printing process.

When the print job is not the second printing (S2: NO), i.e., the first printing, when the print job is not the high-gradation printing (S3: NO), i.e., the low-gradation printing, or when the print job is not the low-speed printing (S4: NO), i.e., the high-speed printing, the CPU 51*a* selects one to three drive waveform data corresponding to the printing method (S13) and starts the second multiplexing process (S14). The second multiplexing process is similar to the generation and separation process shown in the above-described embodiment, except that the number of drive waveform data Da-Dd to be used is reduced. In the second multiplexing process, the comparing circuit 57 selects the data indicating the drive waveform based on the amplitude of the voltage in a partial time period from the multiple drive waveform data selected by the CPU 51a. After executing step S14, the CPU 51a proceeds to S7.

Figure 11:
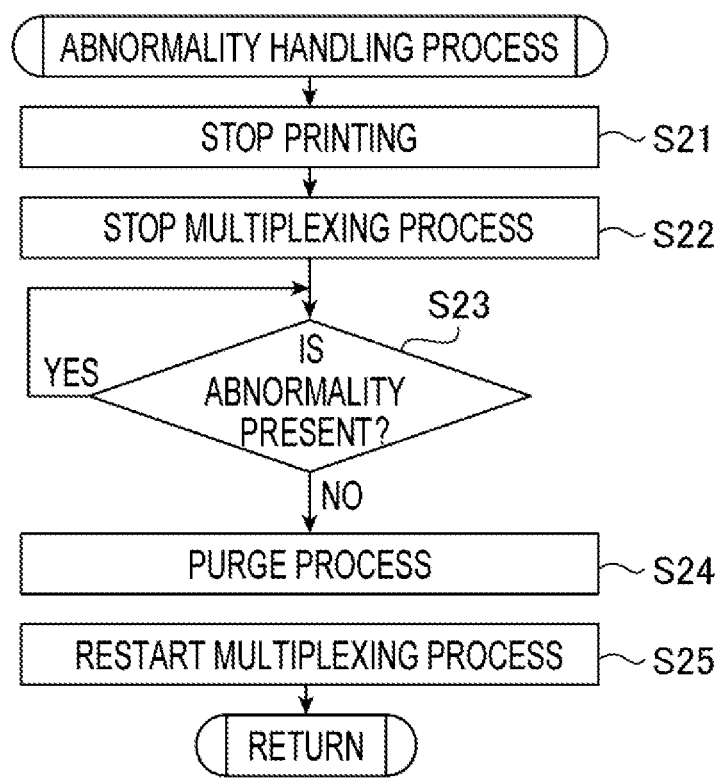
FIG. 11 is a flowchart illustrating an abnormal process.

FIG. 11 is a flowchart illustrating the abnormality handling process performed by the CPU 51a. It is noted that the abnormality handling process may be performed by a CPU other than the CPU 51a. The CPU 51a determine whether there is an abnormality or not while performing the print task. When the CPU 51a determines that there is the abnormality (S8: YES), the CPU 51a stops printing (S21) and stops the first multiplexing process or the second multiplexing process (S22). That is, the CPU 51a stops generating the time-division multiplex signals and stops separating the drive waveform signals. In other words, CPU 51a stops generating the time-division multiplex signal in such a manner that the 0V signal is not included in the time-division multiplex signal during the time period when the 1V signal or 2V signal is present, and the CPU 51a stops generating the synchronization signals A-D for separating the drive waveform signal from the time-division multiplex signal that does not include the 0V signal during the time period when the 1V signal or 2V signal is present.

Then, the CPU 51a determines whether the abnormality has not been resolved (S23). When the abnormality is not resolved (i.e., when the abnormality is present) (S23: YES), for example, when the sheet jam has not been resolved, the CPU 51a returns to S23. When the abnormality has been resolved (i.e., when no abnormality is detected) (S23: NO), the CPU 51a performs a purge process (S24). The purge process is a process that causes a well-known pump to suck the ink from the nozzles. Then, the CPU 51a restarts the first or second multiplexing process (S25) and returns the process to S7. In other words, CPU 51a restarts generating the time-division multiplex signal in such a manner that the 0V signal is not included in the time-division multiplex signal during the time period when the 1V signal or 2V signal is present, and the CPU 51a restarts generating the synchronization signals A-D for separating the drive waveform signal from the time-division multiplex signal that does not include the 0V signal during the time period when the 1V signal or 2V signal is present.

In the printing device according to the modified embodiment, a particular number, which corresponds to the printing method, of the drive waveform data is selected from the multiple drive waveform data. Therefore, compared to the case where the number of drive waveform data used for printing is reduced and all drive waveform data is used, the number of synchronization signals can be reduced, the switching frequency in the switch group 54 can be reduced, and noise generation and power consumption can be suppressed.

Hereinafter, a printing device according to another modified embodiment will be described. Of the configuration of the printing device according to the present modification, the same numbers are used for configurations similar to those in the above-described embodiment and modified embodiment, and detailed descriptions are omitted. FIG. 12A shows a time-series plot of one cycle of drive waveform data D-Dd, FIG. 12B shows a graph indicating a time-division multiplex signal, and FIG. 12C shows a synchronization signal A. FIGS. 13A-13C show synchronization signals B-D.

In the other modified embodiment, when there are multiple occurrences of voltages having the same value that constitute the time-division multiplex signal shown in FIG. 6B of the above-described embodiment within a particular time period, i.e., 1 μs, the voltages of the same value are grouped into one. For example, during a period from time 2 to time 3 μs, the voltage values Va(X) and Vc(X) in FIG. 6B are both V1, so they are grouped into a voltage value V1 that is held continuously during a period from time 2 to time 3 μs (see FIG. 12B). That is, the CPU 51a reduces the number of drive waveforms by grouping multiple drive waveforms of the same voltage value selected during a particular time period into one drive waveform.

As shown in FIG. 12C and FIGS. 13A-13C, during a period from time 2 to time 3 μs, an allocation time allocated to each of the voltage values Va(X) and Vc(X) is 1 μs. That is, the CPU 51a calculates the allocation time allocated to the selected drive waveform based on the number of drive waveforms after the number of drive waveforms has been reduced. During a period from time 2 to time 3 μs, the number of the drive waveforms selected in the above-described embodiment is two, while in the other modified embodiment (i.e., the present embodiment), the number of the selected drive waveforms is reduced to one. The CPU 51a calculates 1 μs/(the number of selected drive waveforms), i.e., 1 μs/1=1 μs, as the allocation time allocated per each selected drive waveform. The calculated allocation time is the time common to the voltage values Va(X) and Vc(X). The CPU 51a sets 1 μs during a period from time 2 to time 3 μs as the superimposed allocation time common to the voltage values Va(X) and Vc(X). During a period from time 2 to time 3 μs, each of the synchronization signals A and C is maintained to be in the high-level state.

Similarly, during a period from time 3 to time 4 μs, the voltage values Va(X) and Vc(X) are grouped into a continuously maintained voltage V2 to be maintained during a period from time 3 to time 4 μs. The allocation time allocated to each of the voltage values Va(X) and Vc(X) is 1 μs. During the period from time 3 to time 4 μs, each of the synchronization signals A and C is maintained to be in the high-level state.

During a period from time 4 to time 5 μs, as shown in FIGS. 12A and 12B, the voltage value Va(X) and the voltage value Vc(X) are both V1, and is grouped into continuously maintained voltage value V1. Therefore, the number of the selected drive waveforms is reduced from three to two. The CPU 51a calculates 1 μs/(the number of selected drive waveforms), i.e., 1 μs/2=½ μs, as the allocation time allocated per each selected drive waveform. The CPU 51a allocates a period from time 4 to time (4+½) μs to each of the voltage values Va(X) and Vc(X), and a period from time (4+½) to time 5 μs to the voltage value Vb(X), as shown in FIG. 12C and FIGS. 13A-13C.

During a period from time 5 to time 6 μs, as shown in FIGS. 12A and 12B, the voltage values Va(X), Vb(X) and Vc(X) are grouped into a voltage value V2 which is to be continuously maintained during a period from time 5 to time 6 μs. Therefore, the number of selected drive waveforms is reduced from three to one. The CPU 51a calculates 1 μs/(the number of selected drive waveforms), i.e., 1 μs/1=1 μs, as the allocation time allocated per each selected drive waveform. The calculated allocation time is a time common to the voltage values Va(X), Vb(X) and Vc(X). The CPU 51a sets 1 μs which is a period between time 5 to time 6 μs as the overlapping allocation time common to the voltage values Va(X), Vb(X) and Vc(X), as shown in FIGS. 12C, 13A and 13B. Similar processes are performed during a period from time 6 to time 7 μs, and a period from time 7 to time 8 μs.

During a period from time 8 to time 9 μs, as shown in FIGS. 12A and 12B, the voltage values Va(X), Vc(X) and Vd(X) are grouped into a voltage value V1 which is to be continuously maintained during a period from time 8 to time 9 μs. Therefore, the number of selected drive waveforms is reduced from four to two. The CPU 51*a* calculates 1 μs/(the number of selected drive waveforms), i.e., 1 μs/2=½μs, as the allocation time allocated per each selected drive waveform. The calculated allocation time is a time common to the voltage values Va(X), Vc(X) and Vd(X). The CPU 51*a* sets ½ μs which is a period between time 8 to time (8+½) μs as the overlapping allocation time common to the voltage values Va(X), Vc(X) and Vd(X). During a period from time 8 to time (8+½) μs, each of the synchronization signals A, C and D is maintained to be in the high-level state. A time period from time (8+½) to time 9 μs is allocated to the voltage value Vb(X).

During a period from time 9 to time 10 μs, as shown in FIGS. 12A and 12B, the voltage values Vb(X) and Vd(X) are grouped into a voltage value V2 which is to be continuously maintained during a period from time 9 to time 10 μs. Therefore, the number of selected drive waveforms is reduced from two to one. The CPU 51*a* calculates 1 μs/(the number of selected drive waveforms), i.e., 1 μs/1=1 μs, as the allocation time allocated per each selected drive waveform. The calculated allocation time is a time common to the voltage values Vb(X) and Vd(X). The CPU 51*a* sets 1 μs which is a period between time 9 to time 10 μs as the overlapping allocation time common to the voltage values Vb(X) and Vd(X). Similar processes are performed for a period from time 10 to time 11 μs, a period from time 11 to time 12 μs, a period from time 12 to time 13 μs, and a period from time 13 to time 14 μs.

During a period from time 14 to time 15 μs, as shown in FIGS. 12A and 12B, the voltage values Va(X), Vb(X) and Vd(X) are grouped into a voltage value V1 which is to be continuously maintained during a period from time 14 to time 15 μs. Therefore, the number of selected drive waveforms is reduced from three to one. The CPU 51*a* calculates 1 μs/(the number of selected drive waveforms), i.e., 1 μs/1=1 μs, as the allocation time allocated per each selected drive waveform. The calculated allocation time is a time common to the voltage values Va(X), Vb(X) and Vd(X). The CPU 51*a* sets 1 μs which is a period between time 14 to time 15 μs as the overlapping allocation time common to the voltage values Va(X), Vb(X) and Vd(X). Processes from time 15 μs onward are similar to those in the above-described embodiment.

In the printing device according to the present modification, the drive waveforms that have the same voltage value in a particular time period are grouped together to reduce the number of drive waveforms to be selected, and the allocation time for each voltage value can be made longer. As a result, the reproducibility of drive waveforms can be improved.

The embodiment and modified embodiments disclosed above should be considered in all respects illustrative and not restrictive. The technical features described in the present disclosures can be grouped when appropriate, and aspects of the present disclosures are intended to include any modifications within the scope of the claims and their equivalents.

In the above-described embodiment, the synchronization signals A-D are pulse waves and have a high-level (H) period and a low-level (L) period, but they are not necessarily limited to this. The synchronization signals A-D do not have to be pulse waves. For example, the rising edge of each of the synchronization signals A-D may not be vertical but may have an inclination smaller than 90 degrees. Furthermore, the falling edge of each of the synchronization signals A-D may not be vertical but may have an inclination less than 90 degrees.

In the above-described embodiment, the comparing circuit 57 allocates one time slot for each voltage value of which the amplitude is greater than a particular value (0V in the above-described embodiment) at each period from time k to time (k+1), i.e., at each particular time period. However, such a configuration may be modified. Concretely, the comparing circuit 57 associates TS1 with the voltage value Va(X), with the voltage value Vb(X), with the voltage value Vc(X), or with the voltage value Vd(X), and outputs the same to the switching circuit 59 and each of the synchronization signal generating circuits 62*a*-62*d*. In other words, a drive waveform with a voltage amplitude of 0V is selected and a time-division multiplex signal is generated.

What is claimed is:

1. A printing device, comprising
a nozzle configured to eject liquid by an energy generating element;
a first selector configured to select, for each particular time period, data indicating a drive waveform based on a voltage value in the particular time period from a plurality pieces of data indicating a plurality of drive waveforms, the plurality of drive waveforms including a first drive waveform and a second drive waveform, the second drive waveform being different from the first drive waveform;
a signal generator configured to generate a time-division multiplex signal which is transmittable by a single signal based on the data indicating the drive waveform selected by the first selector; and
a separator configured to separate a drive waveform signal indicating the drive waveform from the time-division multiplex signal generated by the signal generator;
wherein the energy generating element is configured to be driven by the drive waveform separated by the separator, and
wherein the smaller a number of the drive waveforms are selected by the first selector, the longer an assigned time period, in the time period, assigned per the drive waveform selected by the first selector.

2. The printing device according to claim 1,
wherein the separator is configured to separate the drive waveform from the time-division multiplex signal based on a pulse signal, and
wherein a pulse width of the pulse signal becomes longer as a length of the assigned time period.

3. The printing device according to claim 2,
wherein the pulse width of the pulse signal is shorter than the particular time period when a number of kinds of data indicating the selected drive waveforms is plural.

4. The printing device according to claim 1,
wherein the separator is configured to separate the drive waveform from the time-division multiplex signal based on a pulse signal, and
wherein a pulse width of the pulse signal is shorter than the assigned time period.

5. The printing device according to claim 1, further comprising:
a second selector configured to select, when the printing device receives a print job, a drive waveform corresponding to a printing method indicated by the print job, wherein the printing method indicated by the print job includes a superimpose printing of performing, after first printing on a printing medium, superimposing second printing on an area of the printing medium where the first printing is performed, wherein, a number of kinds of the plurality of drive waveforms is less when the first printing is performed than when the second printing is performed, wherein, when the printing method indicated by the print job is the superimpose printing, and when the first printing is performed, the second selector is configured to select the data from the plurality of drive waveforms of a smaller number of types than when the second printing is performed, and wherein the first selector is configured to select the drive waveform based on a voltage value in the particular time period from the plurality pieces of data indicating the plurality of drive waveforms selected by the second selector.

6. The printing device according to claim 1, further comprising:
a second selector configured to select, when the printing device receives a print job, a drive waveform corresponding to a printing method indicated by the print job, wherein, a number of kinds of the plurality of drive waveforms is less when the printing method indicated by the print job is low-gradation printing than when the printing method indicated by the print job is high-gradation printing, wherein, when the print job is the low-gradation printing, the second selector is configured to select the data from the plurality of drive waveforms of a smaller number of types than when the print job is the high-gradation printing, and wherein the first selector is configured to select the drive waveform based on a voltage value in the particular time period from the plurality pieces of data indicating the plurality of drive waveforms selected by the second selector.

7. The printing device according to claim 1, further comprising:
a second selector configured to select, when the printing device receives a print job, a drive waveform corresponding to a printing method indicated by the print job, wherein, a number of kinds of the plurality of drive waveforms is less when the printing method indicated by the print job is high-speed printing than when the printing method indicated by the print job is low-speed printing, wherein, when the print job is the high-speed printing, the second selector is configured to select the data from the plurality of drive waveforms of a smaller number of types than when the print job is the low-speed printing, and wherein the first selector is configured to select the drive waveform based on a voltage value in the particular time period from the plurality pieces of data indicating the plurality of drive waveforms selected by the second selector.

8. The printing device according to claim 1, further comprising a controller configured to perform:
an abnormality determining process of determining whether there is an abnormally in a printing process;
a stopping process of stopping selecting of the data indicating the drive waveform by the first selector when the abnormality determining process determines that there is the abnormally in the printing process;
an abnormality-resolve determining process of determining whether the abnormally is resolved; and
a restarting process of restarting selecting of the data indicating the drive waveform by the first selector when the abnormality-resolve determining process determines that the abnormally is resolved.

9. The printing device according to claim 1,
wherein the data includes at least first data and second data, the first data indicating a first drive waveform, the second data indicating a second drive waveform,
wherein the first selector is configured to:
select one of the first data and the second data in a case where a voltage value indicated by the first data and a voltage indicated value the second data are a same at a first changing time when the voltage value indicated by the first data is changed; and
select one of the first data and the second data in a case where a voltage value indicated by the first data and a voltage indicated value the second data are a same at a second changing time when the voltage value indicated by the second data is changed, and
wherein the assigned time period is based on a number of kinds of data indicating a drive waveform after one of the first data and the second data is selected.

10. A printing method by ejecting liquid by an energy generating element, the printing method comprising:
selecting, for each particular time period, data indicating a drive waveform based on a voltage value in the particular time period from a plurality pieces of data indicating a plurality of drive waveforms, the plurality of drive waveforms including a first drive waveform and a second drive waveform, the second drive waveform being different from the first drive waveform;
generating a time-division multiplex signal which is transmittable by a single signal based on the data indicating the drive waveform selected by the first selector; and
separating a drive waveform signal indicating the drive waveform from the time-division multiplex signal generated by the signal generator;
wherein the energy generating element is configured to be driven by the drive waveform separated by the separator, and
wherein the smaller a number of the drive waveforms are selected by the selecting, the longer an assigned time period, in the time period, assigned per the drive waveform selected by the selecting.

11. A non-transitory computer-readable recording medium for a printer configured to print by ejecting liquid by an energy generating element, the non-transitory computer-readable recording medium containing computer-readable instructions causing, when executed by a controller of the printer, the printer to perform:
selecting, for each particular time period, data indicating a drive waveform based on a voltage value in the particular time period from a plurality pieces of data indicating a plurality of drive waveforms, the plurality of drive waveforms including a first drive waveform and a second drive waveform, the second drive waveform being different from the first drive waveform;
generating a time-division multiplex signal which is transmittable by a single signal based on the data indicating the drive waveform selected by the first selector; and
separating a drive waveform signal indicating the drive waveform from the time-division multiplex signal generated by the signal generator;

wherein the energy generating element is configured to be driven by the drive waveform separated by the separator, and wherein the smaller a number of the drive waveforms are selected by the selecting, the longer an assigned time period, in the time period, assigned per the drive waveform selected by the selecting.

\* \* \* \* \*